(12) United States Patent
Lin et al.

(10) Patent No.: US 11,113,502 B2
(45) Date of Patent: Sep. 7, 2021

(54) IMAGE MODULE AND BIOMETRIC DEVICE USING THE SAME

(71) Applicant: INDUSTRIAL TECHNOLOGY RESEARCH INSTITUTE, Hsinchu (TW)

(72) Inventors: Ding-Zheng Lin, Taipei (TW); Yu-Ling Hsu, Taipei (TW); Ping-Chen Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/730,634

(22) Filed: Dec. 30, 2019

(65) Prior Publication Data
US 2020/0226342 A1 Jul. 16, 2020

Related U.S. Application Data

(60) Provisional application No. 62/791,126, filed on Jan. 11, 2019.

(30) Foreign Application Priority Data

Oct. 21, 2019 (TW) .................. 108137852

(51) Int. Cl.
*G06K 9/28* (2006.01)
*G06K 9/00* (2006.01)
(Continued)

(52) U.S. Cl.
CPC ......... *G06K 9/0004* (2013.01); *G02B 3/0006* (2013.01); *G06F 21/32* (2013.01); *G06K 9/209* (2013.01)

(58) Field of Classification Search
CPC .................. G06K 9/0004; G06K 9/00046
See application file for complete search history.

(56) References Cited

U.S. PATENT DOCUMENTS

| 8,853,758 | B2 | 10/2014 | Ootsuka |
| 10,061,964 | B2 | 8/2018 | Huang et al. |
(Continued)

FOREIGN PATENT DOCUMENTS

| CN | 106022324 A | 10/2016 |
| CN | 106068563 A | 11/2016 |
(Continued)

OTHER PUBLICATIONS

Taiwanese Office Action and Search Report, dated Jul. 20, 2020, for Taiwanese Application No. 108137852.
(Continued)

*Primary Examiner* — Brian Werner
(74) *Attorney, Agent, or Firm* — Birch, Stewart, Kolasch & Birch LLP

(57) ABSTRACT

An image module includes a photosensitive element and a light-screening structure disposed on the photosensitive element. The light-screening structure includes a light-transmitting layer. The light-screening structure also includes a first light-shielding layer disposed in the light-transmitting layer and having a first light passage portion. The light-screening structure further includes a second light-shielding layer disposed between the first light-shielding layer and the photosensitive element and having a second light passage portion. The light-screening structure includes a condensing structure disposed on the light-transmitting layer. The first light passage portion and the second light passage portion correspond to the photosensitive element. Light passing through the condensing structure produces a concentrated beam, and the apertures of the first light passage portion and the second light passage portion are respectively adjusted
(Continued)

according to the widths of the concentrated beam at the first light-shielding layer and at the second light-shielding layer.

11 Claims, 14 Drawing Sheets

(51) Int. Cl.
    *G06K 9/20*     (2006.01)
    *G06F 21/32*    (2013.01)
    *G02B 3/00*     (2006.01)

(56) References Cited

U.S. PATENT DOCUMENTS

| | | | |
|---|---|---|---|
| 10,141,365 B2 | 11/2018 | Watanabe et al. | |
| 2018/0233531 A1* | 8/2018 | Huang | H01L 27/14678 |
| 2019/0026530 A1* | 1/2019 | Wu | H01L 27/146 |

FOREIGN PATENT DOCUMENTS

| | | |
|---|---|---|
| CN | 106468845 A | 3/2017 |
| CN | 107480579 A | 12/2017 |
| CN | 108427908 A | 8/2018 |
| CN | 207851850 U | 9/2018 |
| KR | 10-2018-0001904 A | 1/2018 |
| TW | I552091 B | 10/2016 |
| TW | 201814333 A | 4/2018 |
| TW | I633493 B | 8/2018 |
| TW | I651660 B | 2/2019 |
| TW | I652626 B | 3/2019 |
| WO | WO 2018/004243 A1 | 1/2018 |

OTHER PUBLICATIONS

Chinese Office Action and Search Report for Chinese Application No. 201911291307.0, dated Mar. 22, 2021.

* cited by examiner

IMAGE MODULE AND BIOMETRIC DEVICE USING THE SAME

CROSS REFERENCE TO RELATED APPLICATIONS

This application claims the benefit of U.S. Provisional Application No. 62/791,126, filed Jan. 11, 2019, and also claims the benefit of Taiwan Patent Application No. 108137852, filed Oct. 21, 2019, the entirety of which are incorporated by reference herein.

TECHNICAL FIELD

Embodiments of the present disclosure relate to an image module and a biometric device using the same, and in particular they relate to a thin image module and a biometric device using the same.

BACKGROUND

An image module may be used in a variety of applications. For example, an image module may be applied in biometric technology. Biometric technology is the technology that uses the physiological or behavioral characteristics of the human body to achieve identity recognition and authentication authorization. The physiological characteristics of the human body may include, for example, fingerprints, palm prints, vein distribution, iris, retina, and facial features, and so on. Nowadays, biometric technology has been applied in fields such as digital assistants, smartphones, notebook computers, debit cards, electronic wallets, and customs passage that have a high demand for confidential information and personal security.

A device using biometric technology (e.g., fingerprint recognition devices, face recognition devices, iris recognition devices, and so on) often requires a large volume to accommodate an image module in the device, making it unsuitable for use in miniaturized or portable electronic devices. If the components of an image module are omitted to achieve the purpose of thinning, the recognition success rate of the biometric device may be reduced.

SUMMARY

In accordance with some embodiments of the present disclosure, an image module and biometric device using the same are provided, which may be used in miniaturized or portable electronic devices. Moreover, they also help to reduce crosstalk to improve the accuracy of identifying the characteristic points of an organism.

The embodiments of the present disclosure include an image module. The image module includes a photosensitive element and a light-screening structure disposed on the photosensitive element. The light-screening structure includes a light-transmitting layer. The light-screening structure also includes a first light-shielding layer disposed in the light-transmitting layer and having a first light passage portion. The light-screening structure further includes a second light-shielding layer disposed in the light-transmitting layer and between the first light-shielding layer and the photosensitive element and having a second light passage portion. The light-screening structure includes a condensing structure disposed on the light-transmitting layer. The first light passage portion and the second light passage portion correspond to the photosensitive element. Light passing through the condensing structure produces a concentrated beam, and the aperture of the first light passage portion and the aperture of the second light passage portion are respectively adjusted according to the width of the concentrated beam at the first light-shielding layer and the width of the concentrated beam at the second light-shielding layer.

The embodiments of the present disclosure include an image module. The image module includes a photosensitive array including a plurality of photosensitive elements. The image module also includes a light-screening structure disposed on the photosensitive array. The light-screening structure includes a light-transmitting layer. The light-screening structure also includes a plurality of light-shielding layers disposed in the light-transmitting layer and each having a plurality of light passage portions. The light-screening structure further includes a condensing array disposed on the light-transmitting layer and having a plurality of condensing structures. The light passage portions correspond to the photosensitive elements. Light passing through the condensing array produces a plurality of concentrated beams, and the aperture of each of the light passage portions is adjusted according to the width of the corresponding concentrated beam at each of the light-shielding layers.

The embodiments of the present disclosure include a biometric device. The biometric device includes a substrate. The biometric device also includes a light source disposed on the substrate for emitting light to an organism. The biometric device further includes the foregoing image module for receiving light from the light source.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
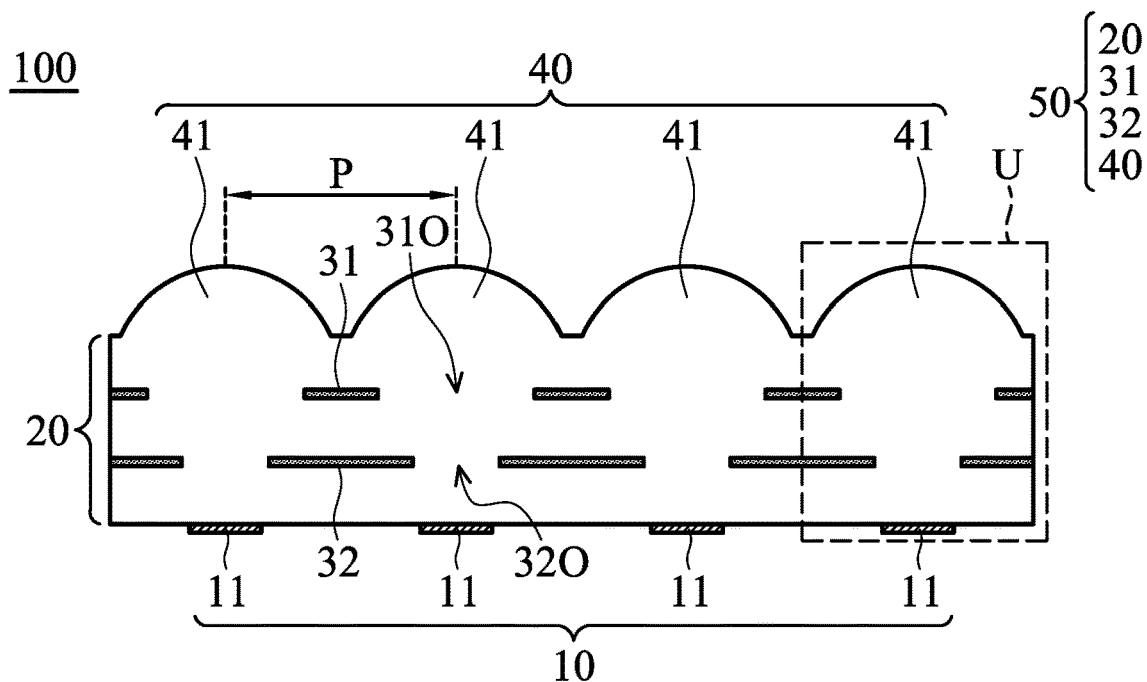
FIG. 1 is a partial cross-sectional view illustrating an image module according to one embodiment of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional operations can be provided before, during, and after the method, and some of the operations described can be replaced or eliminated for other embodiments of the method.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood through one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

Different embodiments disclosed below may repeat reference numerals and/or letters in the various examples. This repetition is for the purpose of simplicity and clarity and does not in itself dictate a relationship between the various embodiments and/or configurations discussed.

Figure 2:
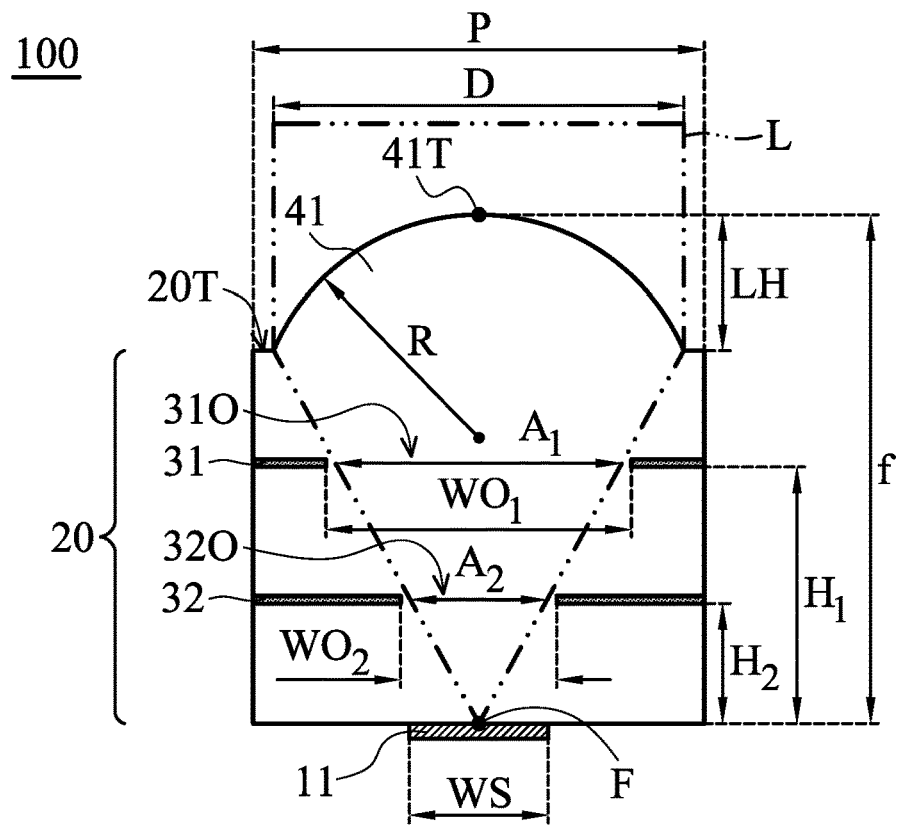
FIG. 2 is a partially enlarged schematic diagram of the image module shown in FIG. 1.

FIG. 1 is a partial cross-sectional view illustrating an image module 100 according to one embodiment of the present disclosure. FIG. 2 is a partially enlarged schematic diagram of the image module 100 shown in FIG. 1. Referring to FIG. 1, in some embodiments, the image module 100 may include a photosensitive array 10, and the photosensitive array 10 may include a plurality of photosensitive elements 11.

In some embodiments, the photosensitive array 10 may be a one-dimensional array or a two-dimensional array, but the present disclosure is not limited thereto. In some embodiments, the photosensitive element 11 may be a pixel, a sub-pixel, or a portion of a plurality of pixels. Therefore, the image module 100 shown in FIG. 2 may be referred to as an enlarged schematic diagram of a photosensitive unit U shown in FIG. 1, but the present disclosure is not limited thereto. In some embodiments, the photosensitive element 11 may include or correspond to at least one photodiode (e.g., a complementary metal-oxide-semiconductor (CMOS) photosensitive element or a charge-coupled device (CCD)) and/or other applicable elements, which may convert the received optical signal into a current signal.

Referring to FIG. 1 and FIG. 2, the image module 100 may include a light-transmitting layer 20 disposed on the photosensitive array 10 (the photosensitive element 11). In some embodiments, the material of the light-transmitting layer 20 may include transparent photoresist, polyimide, epoxy resin, any other applicable material, or a combination thereof. In some embodiments, the material of the light-transmitting layer 20 may include a light curing material, a thermal curing material, or a combination thereof. For example, a spin-on coating process may be performed to coat the light-transmitting layer 20 on the photosensitive array 10 (the photosensitive element 11), but the present disclosure is not limited thereto.

Referring to FIG. 1 and FIG. 2, the image module 100 may include a plurality of light-shielding layers disposed in the light-transmitting layer 20, and each of the light-shielding layers has a plurality of light passage portions corresponding to the photosensitive array 10 (the photosensitive element 11). In particular, the image module 100 includes a first light-shielding layer 31 and a second light-shielding layer 32. The first light-shielding layer 31 and the second light-shielding layer 32 are disposed in the light-transmitting layer 20, and the second light-shielding layer 32 is disposed between the first light-shielding layer 31 and the photosensitive element 11, but the present disclosure is not limited thereto. As shown in FIG. 1 and FIG. 2, the first light-shielding layer 31 may have a first light passage portion 31O, and the second light-shielding layer 32 may have a second light passage portion 32O.

In some embodiments, the material of the light-shielding layer (the first light-shielding layer 31 and the second light-shielding layer 32) may include a metal, such as copper (Cu), silver (Ag), and so on, but the present disclosure is not limited thereto. In some embodiments, the material of the light-shielding layer may include photoresist (e.g., black photoresist, or any other applicable photoresist which is not transparent), ink (e.g., black ink, or any other applicable ink which is not transparent), molding compound (e.g., black molding compound, or any other applicable molding compound which is not transparent), solder mask (e.g., black solder mask, or any other applicable solder mask which is not transparent), epoxy polymer, any other applicable material, or a combination thereof. In some embodiments, the material of the light-shielding layer may include a light curing material, a thermal curing material, or a combination thereof.

In some embodiments, a patterning process may be performed to pattern the forgoing material and form the light-shielding layer (the first light-shielding layer 31 and the second light-shielding layer 32). For example, the patterning process may include soft baking, mask aligning, exposure, post-exposure baking, developing, rinsing, drying, any other applicable process, or a combination thereof, but the present disclosure is not limited thereto.

Referring to FIG. 1 and FIG. 2, the image module 100 may include a condensing array 40 disposed on the light-transmitting layer 20. As shown in FIG. 1, the condensing array 40 may include a plurality of condensing structures 41. For example, the condensing array 40 may be a one-dimensional array or a two-dimensional array, but the present disclosure is not limited thereto.

In some embodiments, the material of the condensing structure 41 may be a transparent material. For example, the material of the condensing structure 41 may include glass, epoxy resin, silicone resin, polyurethane, any other applicable material, or a combination thereof, but the present disclosure is not limited thereto. In some embodiments, the condensing structure 41 may be formed by a photoresist reflow method, a hot embossing method, any other applicable method, or a combination thereof. In some embodiments, the steps of forming the condensing structure 41 (the condensing array 40) may include a spin coating process, a lithography process, an etching process, any other applicable process, or a combination thereof.

Figure 3A:
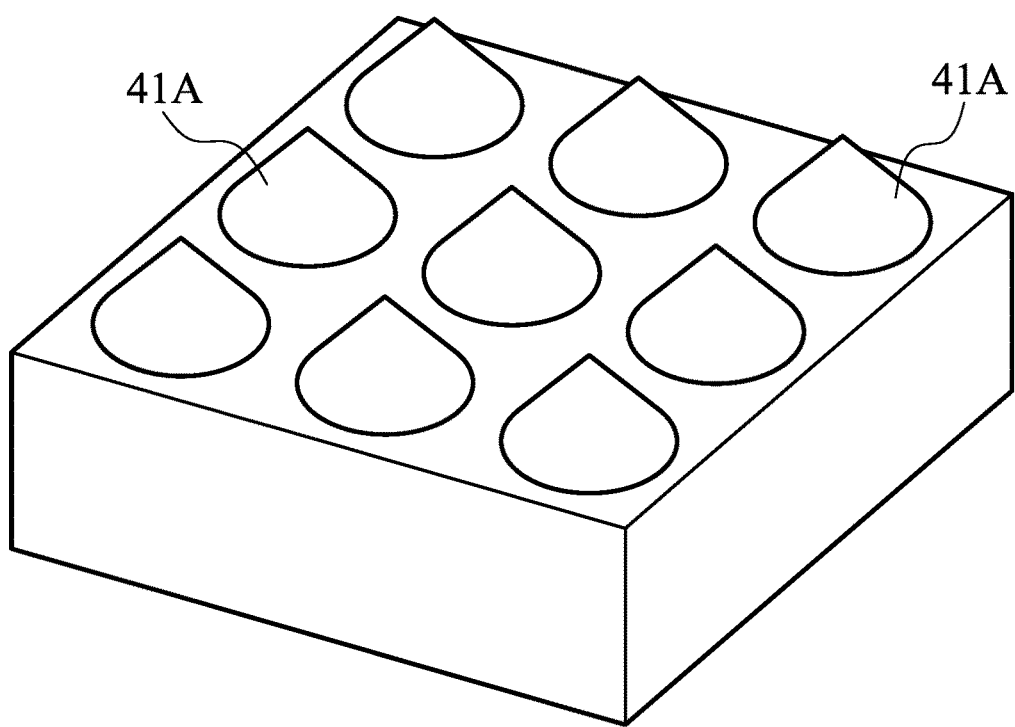
FIG. 3A is a schematic diagram showing a condensing structure in a different example.
Figure 3B:
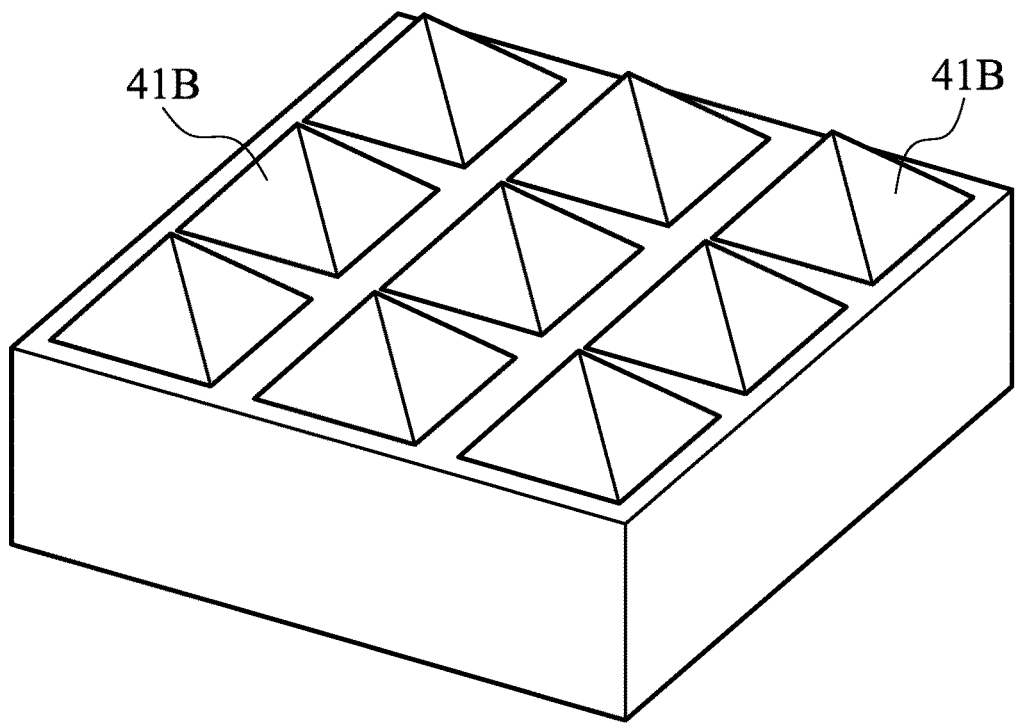
FIG. 3B is a schematic diagram showing a condensing structure in a different example.
Figure 3C:
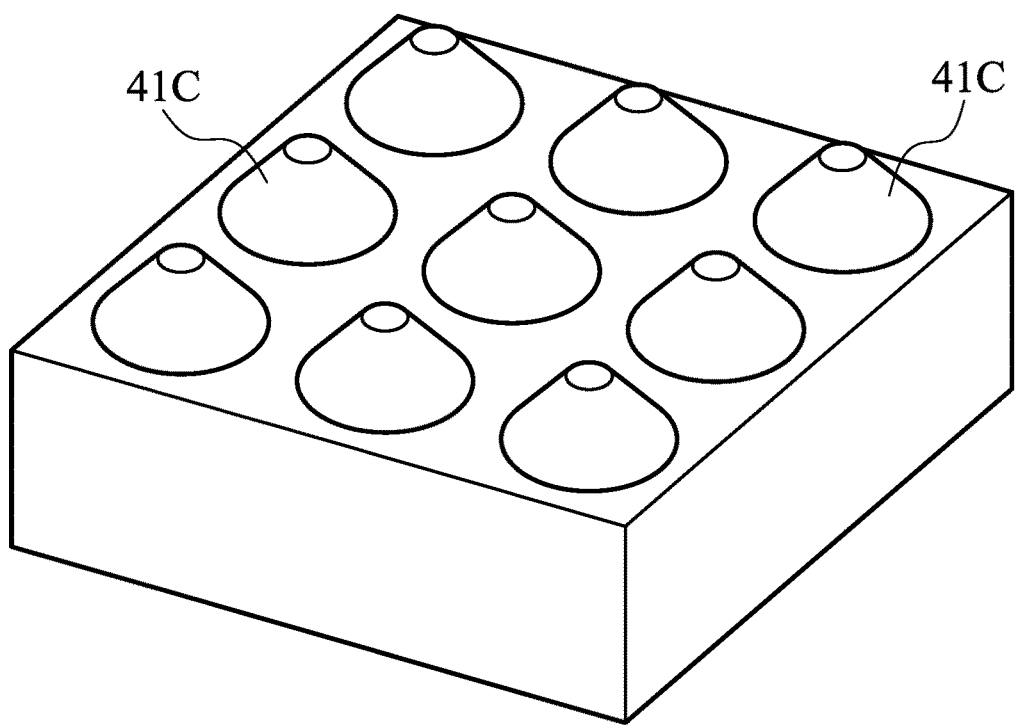
FIG. 3C is a schematic diagram showing a condensing structure in a different example.
Figure 3D:
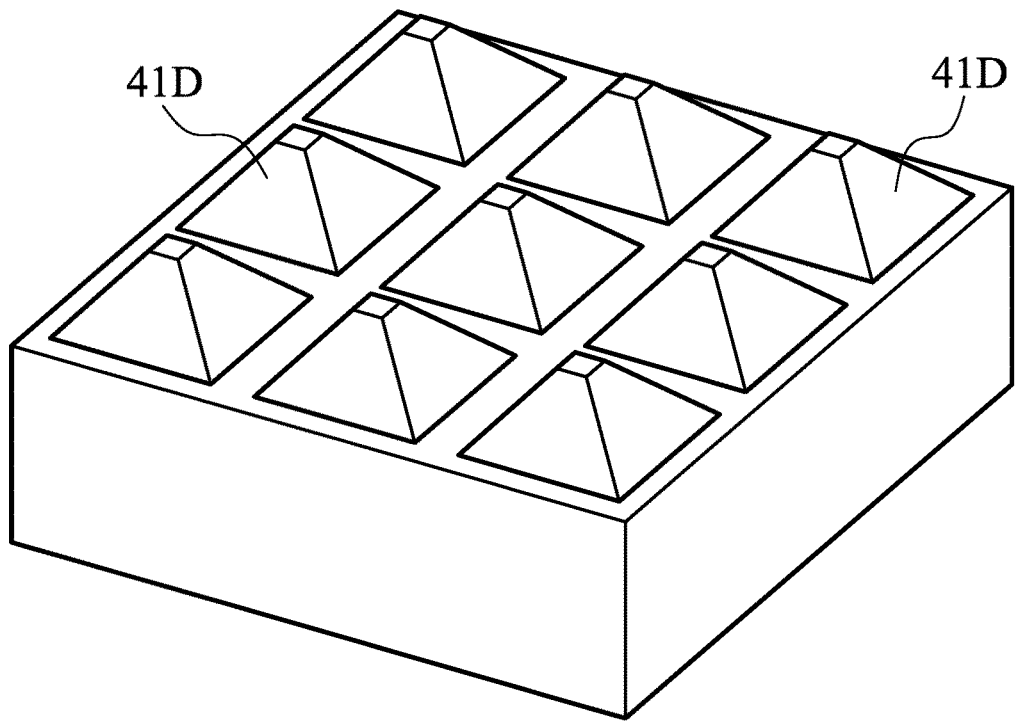
FIG. 3D is a schematic diagram showing a condensing structure in a different example.

In this embodiment, the condensing structure 41 may be a micro-lens structure with a radius of curvature R, for example, a semi-convex lens or a convex lens, but the present disclosure is not limited thereto. FIG. 3A to FIG. 3D are schematic diagrams showing condensing structures in different examples. As shown in FIG. 3A and FIG. 3B, the condensing structure 41A (circular cone) and the condensing structure 41B (quadrangular pyramid) may be micro-pyramid structures. As shown in FIG. 3C and FIG. 3D, the condensing structure 41C (flat top cone) and the condensing structure 41D (truncated Square Pyramid) may be micro-trapezoidal structures. Alternatively, the condensing structure may be a gradient-index structure (not shown).

As shown in FIG. 1, in this embodiment, the light-transmitting layer 20, the light-shielding layer (the first light-shielding layer 31 and the second light-shielding layer 32) and the condensing array 40 (the condensing structure 41) may be formed into a light-screening structure 50. That is, the light-screening structure 50 may be disposed on the photosensitive array 10 (the photosensitive element 11) to filter the incident light angle. When light enters from the top and toward down, the light-screening structure 50 allows near-vertical light beams to enter the photosensitive array 10 and absorbs incident light at other angles.

In the embodiments of the present disclosure, light passing through the condensing array 40 (the condensing structure 41) may produce a plurality of concentrated beams, and the aperture of each of the light passage portions may be adjusted according to the width of a corresponding concentrated beam at each of the light-shielding layers.

In particular, the aperture of the first light passage portion 31O is $WO_1$, the aperture of the second light passage portion 32O is $WO_2$, the aperture $WO_1$ is larger than or equal to the aperture $WO_2$ ($WO_1 \geq WO_2$), the center of aperture $WO_1$ is aligned with the center of the aperture $WO_2$, and the arc apex 41T of the condensing structure 41 (micro-lens), the center of the aperture $WO_1$, the center of the aperture $WO_2$, the center of the photosensitive element 11, and the focal point F of the concentrated beams L are aligned with each other and located on the same axis. The width of the concentrated beam L at the first light-shielding layer 31 is $A_1$, the width of the concentrated beam L at the second light-shielding layer 32 is $A_2$, the ratio of $WO_1$ to $A_1$ is $Q_1$, the ratio of $WO_2$ to $A_2$ is $Q_2$, and the geometric mean of $Q_1$ and $Q_2$ is greater than 0.6 and less than or equal to 1.8

$$\left(0.6 < \sqrt[2]{Q_1 \times Q_2} \leq 1.8\right).$$

The ratio relationship is explained further below. If the ratio $Q_1$ is greater than 1, it means that the aperture $WO_1$ is larger than the width $A_1$ of the concentrated beam L at the first light-shielding layer 31; if the ratio $Q_1$ is less than 1, it means that the aperture $WO_1$ is smaller than the width $A_1$ of the concentrated beam L at the first light-shielding layer 31. Similarly, if the ratio $Q_2$ is greater than 1, it means that the aperture $WO_2$ is larger than the width $A_2$ of the concentrated beam L at the second light-shielding layer 32; if the ratio $Q_2$ is less than 1, it means that the aperture $WO_2$ is smaller than the width $A_2$ of the concentrated beam L at the second light-shielding layer 32.

It should be noted that the number of light-shielding layers in the light-screening structure 50 is not limited to the two layers shown in FIG. 1 and FIG. 2. In some embodiments, the light-screening structure 50 may include n light-shielding layers, n is a positive integer greater than or equal to 2. In these light-shielding layers, the aperture of each of the light passage portions in the k-th light-shielding layer is WO$_k$, the width of each of the concentrated beams L at the k-th light-shielding layer is A$_k$, the ratio of WO$_k$ to A$_k$ is $$Q_k \left( Q_k = \frac{WO_k}{A_k} \right),$$

k is a positive integer less than or equal to n. That is, in the embodiments, the light-screening structure 50 may satisfy the following condition (the geometric mean of Q$_k$ is greater than 0.6 and less than or equal to 1.8) (hereinafter referred to as formula (1)):

$$0.6 < \sqrt[k]{Q_1 \times Q_2 \times ... \times Q_k} \leq 1.8 \qquad (1)$$

Here, the aperture WO$_k$ of each of the light passage portions is smaller than the outside diameter D of the condensing structures 41 (i.e., WO$_k$<D, and the outside diameter D is measured from the horizontal distance between one intersection of the arc surface of the condensing structures 41 and the top surface 20T of the light-transmitting layer 20 to the another intersection of which at the distal end). When the light-screening structure 50 satisfies the foregoing formula (1), a better image quality may be obtained, which will be described later through embodiments and comparative examples.

Moreover, as shown in FIG. 2, the width A$_k$ of the concentrated beam L at the k-th light-shielding layer may be calculated according to the triangular equivalence relationship. That is, the width A$_k$ of the concentrated beam L at the k-th light-shielding layer may satisfy the following condition (formula (2)):

$$A_k = \frac{D \times H_k}{f - LH} \qquad (2)$$

Here, f is the focal length of the condensing structure 41, LH is the maximum thickness of the condensing structure 41 (which is measured from the arc apex 41T of the condensing structure 41 to the top surface 20T of the light-transmitting layer 20), H$_k$ is the distance between the k-th light-shielding layer and the focus position (i.e., the focal point F) of the condensing structure 41 (e.g., the distance between the first light-shielding layer 31 and the focal point F of the condensing structure 41 is H$_1$, and the distance between the second light-shielding layer 32 and the focal point F of the condensing structure 41 is H$_2$), and the photosensitive element 11 is at the focal point F.

In some embodiments, to achieve better image quality, the aperture WO$_k$ of each of the light passage portions in the k-th light-shielding layer may satisfy the following condition (formula (3)) (i.e., the aperture WO$_k$ of each of the light passage portions may be between the product of the width A$_k$ of the concentrated beam L at the k-th light-shielding layer and 0.6 and the product of the width A$_k$ of the concentrated beam L at the k-th light-shielding layer and 1.8):

$$0.6 \times \frac{D \times H_k}{f - LH} < WO_k \leq 1.8 \times \frac{D \times H_k}{f - LH} \qquad (3)$$

Figure 5:
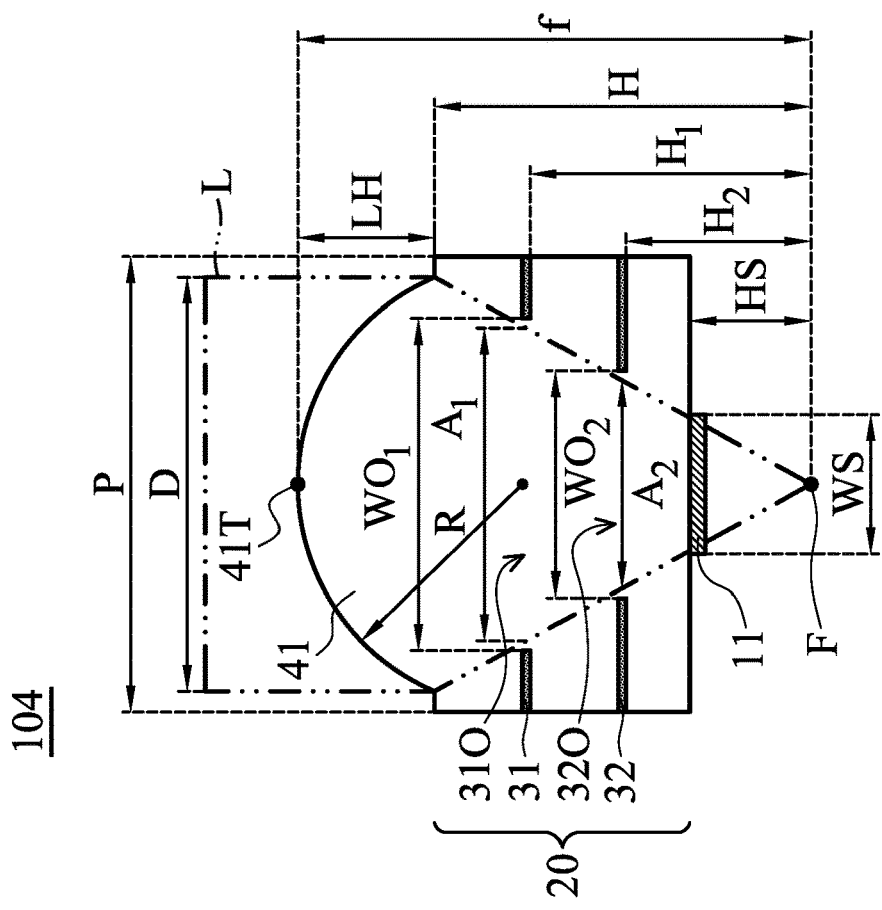
FIG. 5 is a partial cross-sectional view illustrating an image module according to still another embodiment of the present disclosure.
Figure 4:
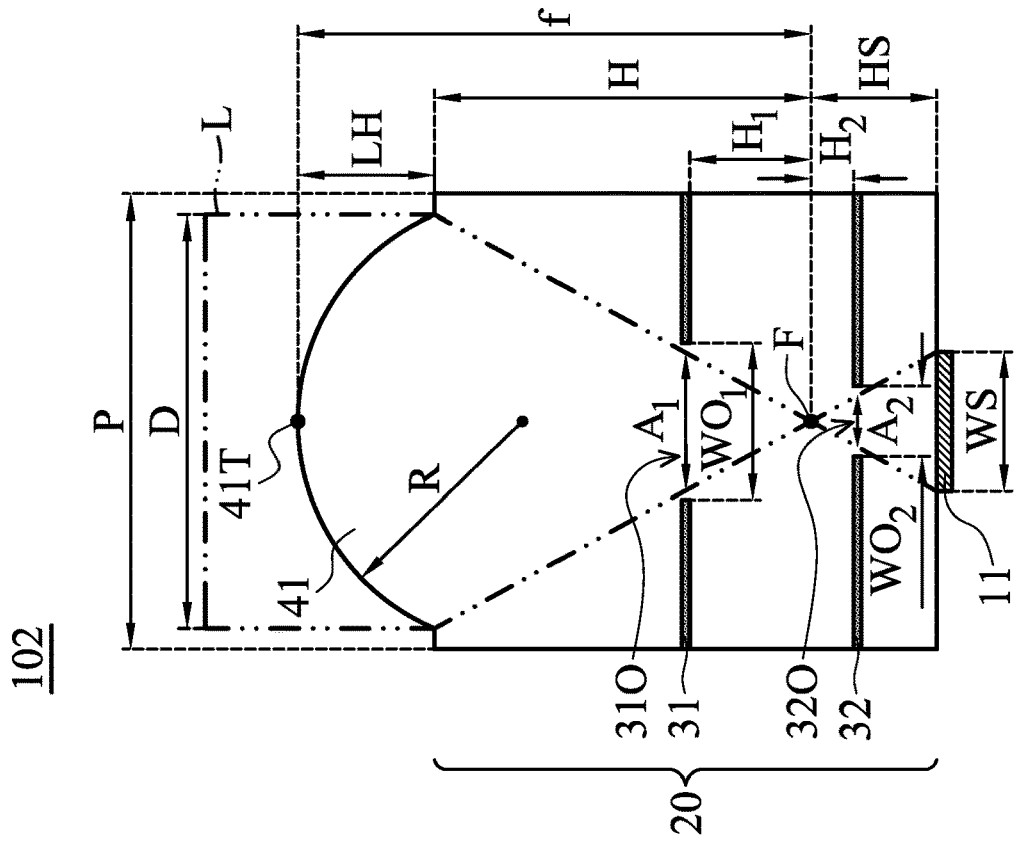
FIG. 4 is a partial cross-sectional view illustrating an image module according to another embodiment of the present disclosure.

Although in the embodiment shown in FIG. 2, the focus position (i.e., the focal point F) of the concentrated beam L is at the top surface of the corresponding photosensitive element 11, the present disclosure is not limited thereto. FIG. 4 is a partial cross-sectional view illustrating an image module 102 according to another embodiment of the present disclosure. FIG. 5 is a partial cross-sectional view illustrating an image module 104 according to still another embodiment of the present disclosure. FIG. 1 and FIG. 2 show the type of the photosensitive element 11 at the focal point F of the condensing structure 41 (i.e., focus type); FIG. 4 and FIG. 5 show the type of the photosensitive element 11 away from the focal point F of the condensing structure 41 (i.e., defocus type). In the embodiments shown in FIG. 4 and FIG. 5, the aperture WO$_1$ is larger than or equal to the aperture WO$_2$(WO$_1$≥WO$_2$), the center of aperture WO$_1$ is aligned with the center of the aperture WO$_2$, and the arc apex 41T of the condensing structure 41 (micro-lens), the center of the aperture WO$_1$, the center of the aperture WO$_2$, the center of the photosensitive element 11, and the focal point F of the concentrated beams L are aligned with each other and located on the same axis.

In the embodiments shown in FIG. 4 and FIG. 5, the focal point F of each concentrated beam L has a distance HS away from the top surface of the corresponding photosensitive element 11. In some embodiments, the distance HS between the focal point F of the concentrated beam L and the top surface of the photosensitive element 11 may satisfy the following condition (hereinafter referred to as formula (4)):

$$-\frac{WS \times (f - LH)}{D} \leq HS \leq \frac{WS \times (f - LH)}{D} \qquad (4)$$

Here, WS is the minimum width of the photosensitive element 11. In addition, the position where the focal point F is defined as 0. When the photosensitive element 11 is below the focal point F (i.e., the image module 102 shown in FIG. 4), the distance HS between the focal point F of the concentrated beam L and the top surface of the corresponding photosensitive element 11 is less than 0 (defocus type, for example, HS=−25 μm); when the photosensitive element 11 is above the focal point F (i.e., the image module 104 shown in FIG. 5), the distance HS between the focal point of the concentrated beam L and the top surface of the corresponding photosensitive element 11 is greater than 0 (defocus type, for example, HS=+25 μm).

The following provides specific specifications of the image modules of the embodiments of the present disclosure, and provides specific specifications of the image modules of multiple comparative examples to compare with the embodiments of the disclosure.

Take Embodiment 1 as an example (the focus type (HS=0), image module 100 in FIG. 1 and FIG. 2), the center-to-center distance P between adjacent two condensing structure 41 is 50.0 μm, the radius of curvature R of the condensing structure 41 is 40.0 μm, the outside diameter D of the condensing structures 41 is 40.0 μm, the maximum thickness LH of the condensing structure 41 is 5.36 μm. The refractive index N of the light-transmitting layer 20 is 1.57, the distance H$_1$ between the first light-shielding layer 31 and the focal point F of the condensing structure 41 is 48.93 μm, and the distance H$_2$ between the second light-shielding layer 32 and the focal point F of the condensing structure 41 is 18.93 μm. The width A$_1$ of the concentrated beam L at the first light-shielding layer 31 is 19.78 μm, and the width A$_2$ of the concentrated beam L at the second light-shielding layer 32 is 7.66 μm. The aperture $WO_1$ of the first light passage portion 31O is 19.78 μm, and the aperture $WO_2$ of the second light passage portion 32O is 7.66 μm. That is, the ratio $Q_1$ of $WO_1$ to $A_1$ is 1, the ratio $Q_2$ of $WO_2$ to $A_2$ is 1, and the geometric mean of $Q_1$ and $Q_2$ is 1

$$(\text{i.e.,} \sqrt[2]{Q_1 \times Q_2} = 1).$$

The minimum width WS of the photosensitive element 11 is 30 μm.

The specific specifications of Embodiment 1 to Embodiment 4 may be referred to Table 1 below, and all embodiments satisfy the aforementioned formula (1). In particular, the structures of the image modules of Embodiment 1 to Embodiment 4 may refer to the image module 100 (focus type, HS=0) shown in FIG. 1 and FIG. 2, and all of Embodiment 1 to Embodiment 4 satisfy the aforementioned formula (1).

TABLE 1

|  | Embodiment 1 | Embodiment 2 | Embodiment 3 | Embodiment 4 |
|---|---|---|---|---|
| N | 1.57 | 1.57 | 1.57 | 1.57 |
| P (μm) | 50 | 50 | 50 | 50 |
| R (μm) | 40 | 40 | 40 | 40 |
| D (μm) | 40 | 40 | 40 | 40 |
| LH (μm) | 5.36 | 5.36 | 5.36 | 5.36 |
| $H_1$ (μm) | 48.93 | 48.93 | 48.93 | 48.93 |
| $H_2$ (μm) | 18.93 | 18.93 | 18.93 | 18.93 |
| HS (μm) | 0 | 0 | 0 | 0 |
| $A_1$ (μm) | 19.78 | 19.78 | 19.78 | 19.78 |
| $A_2$ (μm) | 7.66 | 7.66 | 7.66 | 7.66 |
| $WO_1$ (μm) | 19.78 | 15.82 | 35.6 | 19.78 |
| $WO_2$ (μm) | 7.66 | 6.12 | 13.78 | 19.78 |
| $Q_1$ | 1 | 0.8 | 1.8 | 1 |
| $Q_2$ | 1 | 0.8 | 1.8 | 2.59 |
| $\sqrt[2]{Q_1 \times Q_2}$ | 1 | 0.8 | 1.8 | 1.293 |
| WS (μm) | 30 | 30 | 30 | 30 |

The specific specifications of Comparative Example 1 to Comparative Example 3 may be referred to Table 2 below, and all comparative examples do not satisfy the aforementioned formula (1). In particular, the structures of the image modules of Comparative Example 1 to Comparative Example 3 may refer to the image module 100 (focus type, HS=0) shown in FIG. 1 and FIG. 2, but all of Comparative Example 1 to Comparative Example 3 do not satisfy the aforementioned formula (1).

$$\sqrt[2]{Q_1 \times Q_2} = 0.6$$

in Comparative Example 1 is a critical value of formula (1), but does not meet the formula (1).

TABLE 2

|  | Comparative Example 1 | Comparative Example 2 | Comparative Example 3 |
|---|---|---|---|
| N | 1.57 | 1.57 | 1.57 |
| P (μm) | 50 | 50 | 50 |
| R (μm) | 40 | 40 | 40 |
| D (μm) | 40 | 40 | 40 |

TABLE 2-continued

|  | Comparative Example 1 | Comparative Example 2 | Comparative Example 3 |
|---|---|---|---|
| LH (μm) | 5.36 | 5.36 | 5.36 |
| $H_1$ (μm) | 48.93 | 48.93 | 48.93 |
| $H_2$ (μm) | 18.93 | 18.93 | 18.93 |
| HS (μm) | 0 | 0 | 0 |
| $A_1$ (μm) | 19.78 | 19.78 | 19.78 |
| $A_2$ (μm) | 7.66 | 7.66 | 7.66 |
| $WO_1$ (μm) | 11.86 | 39.56 | 30 |
| $WO_2$ (μm) | 4.6 | 15.3 | 30 |
| $Q_1$ | 0.6 | 2 | 1.52 |
| $Q_2$ | 0.6 | 2 | 3.92 |
| $\sqrt[2]{Q_1 \times Q_2}$ | 0.6 | 2 | 2.972 |
| WS (μm) | 30 | 30 | 30 |

Figure 6:
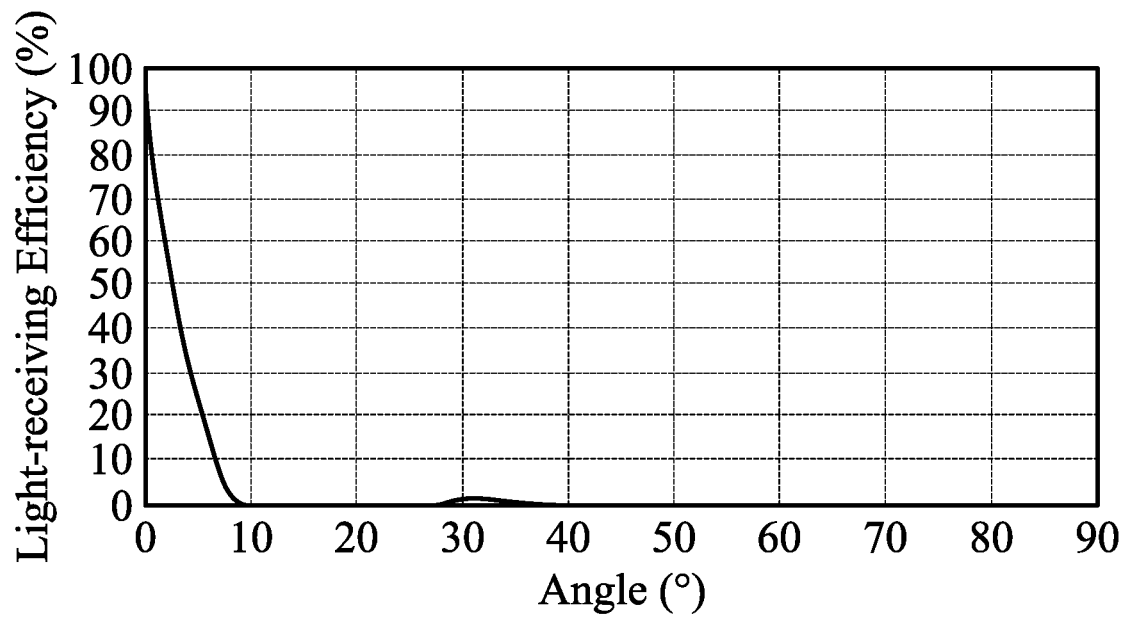
FIG. 6 shows the angular screening distribution curve of the image module made according to the specific specifications of Embodiment 1.

When the aperture $WO_1$ of the first light passage portion 31O is equal to the width $A_1$ of the concentrated beam L at the first light-shielding layer 31 and the aperture $WO_2$ of the second light passage portion 32O is equal to the width $A_2$ of the concentrated beam L at the second light-shielding layer 32 (i.e., $Q_1=Q_2=1$, and $$\sqrt[2]{Q_1 \times Q_2} = 1),$$

which meets formula (1), it may be regarded as an ideal value. That is, the image module made according to the specific specifications of Embodiment 1 may be an ideal image module (i.e., better image quality may be obtained). FIG. 6 shows the angular screening distribution curve of the image module made according to the specific specifications of Embodiment 1 (the structure of the image module of Embodiment 1 may refer to the image module 100 shown in FIG. 1 and FIG. 2). The horizontal axis in FIG. 6 is the angle (degree), and the vertical axis is the light-receiving efficiency (%). At 0 degree, the light-receiving efficiency reaches 90%, which means that when the light source is incident at 0 degree, the ratio of the light flux received by the photosensitive element 11 to the light flux of the incident light source is 0.9, which is 90%. As shown in FIG. 6, when the light source is incident at 0 to 10 degrees, the extreme value of the light-receiving efficiency reaches 90%, and the noise at 10 to 90 degrees is less than 10%.

By comparing other examples with the angular screening distribution curve of Embodiment 1, it would be determined whether the image module of other examples may have good image quality or not (i.e., whether it may have higher resolution). Here, the good image quality must meet the requirement of the main signal intensity greater than 30% of the original signal intensity (i.e., light-receiving efficiency is greater than 30%), no large-angle noise interference (i.e., noise intensity is less than 10% of the main signal intensity), and the beam angle (half-power angle) (i.e., angle between two directions where the light intensity is equal to 50% of the maximum light intensity on a plane which is vertical to the beam centerline) of the main signal is less than 10 degrees. In general, when the photosensitive element 11 is located under a multi-layer structure (e.g., an air-transmitting layer, a light-shielding layer, and so on), the beam angle of the main signal needs to be less than 10 degrees to resolve a 200 μm-wide biometric signal (e.g., a fingerprint signal). If the beam angle of the main signal is greater than 10 degrees, the fingerprint signals may overlap each other and the biometric signal cannot be resolved.

In short, when the signal intensity of the light-receiving energy is greater than 30% of the original signal intensity (i.e., the light-receiving efficiency is greater than 30%) in the range of 0-10 degrees, the noise intensity is less than 10% of the main signal intensity in the range of 10-90 degrees, and the beam angle of the main signal is less than 10 degrees, it may be determined that the image module has good image quality.

Figure 7:
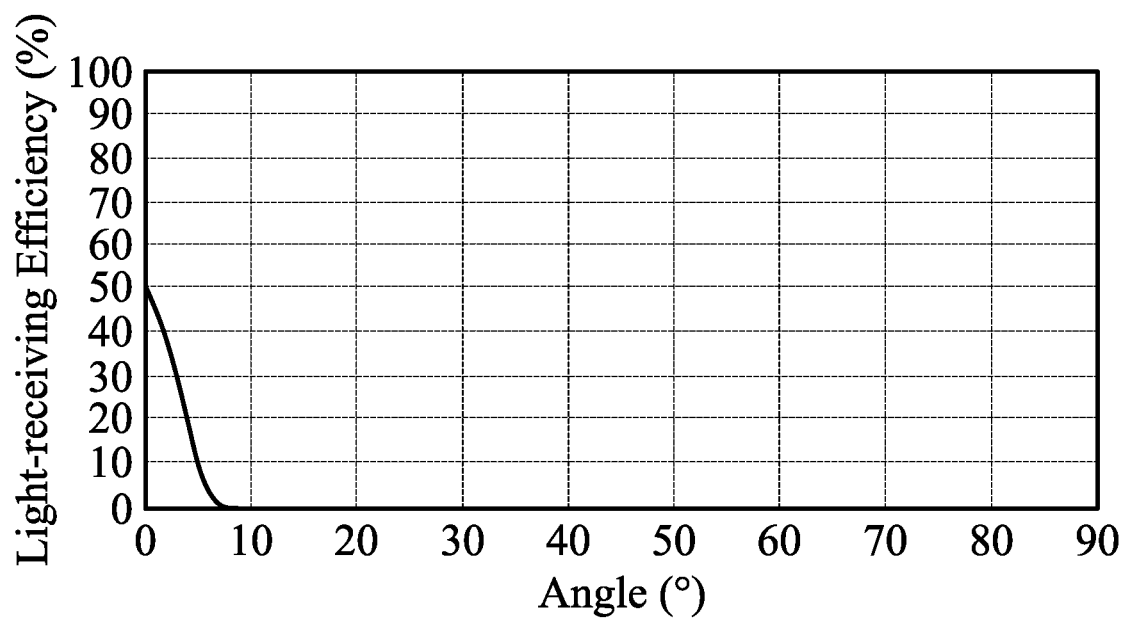
FIG. 7 shows the angular screening distribution curve of the image module made according to the specific specifications of Embodiment 2.

FIG. 7 shows the angular screening distribution curve of the image module made according to the specific specifications of Embodiment 2 (the structure of the image module of Embodiment 2 may refer to the image module 100 shown in FIG. 1 and FIG. 2). As the results of the angular screening distribution curve of Embodiment 2

$$(\sqrt[2]{Q_1 \times Q_2} = 0.8,$$

which satisfies formula (1)) shown in FIG. 7, the light-receiving efficiency reaches 50% at 0 degree; when the light source is incident at 0 to 10 degrees, the extreme value of the light-receiving efficiency reaches 50% (i.e., the light-receiving efficiency is greater than 30%); the beam angle of the main signal is less than 10 degrees; and the noise at 10 to 90 degrees is less than 10%. Therefore, it may be determined that the image module of Embodiment 2 has good image quality.

Figure 8:
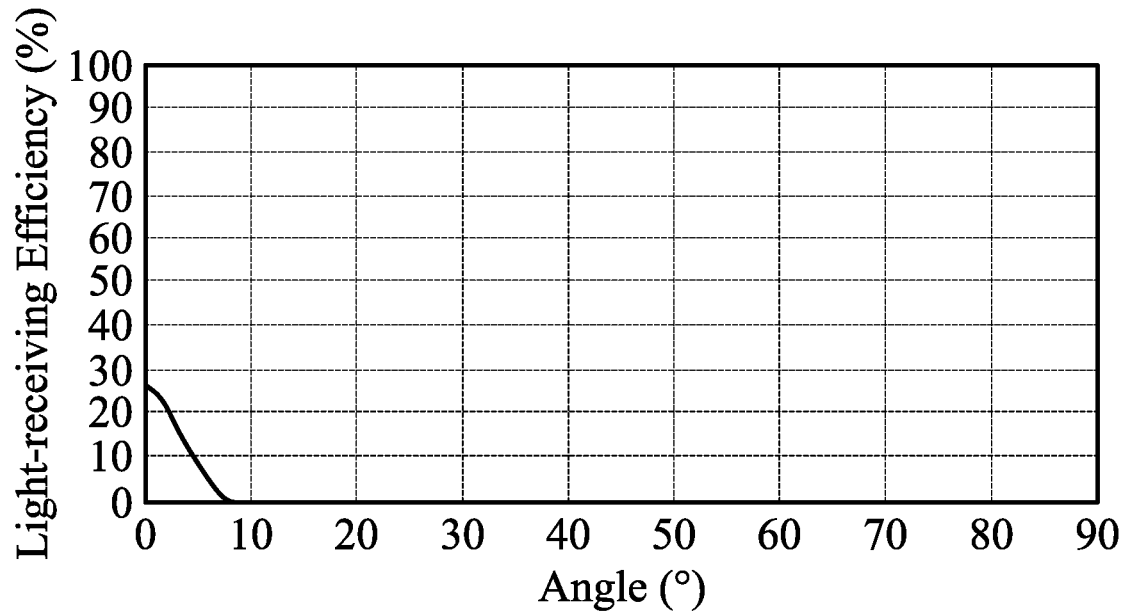
FIG. 8 shows the angular screening distribution curve of the image module made according to the specific specifications of Comparative Example 1.

FIG. 8 shows the angular screening distribution curve of the image module made according to the specific specifications of Comparative Example 1. As the results of the angular screening distribution curve of Comparative Example 1

$$(\sqrt[2]{Q_1 \times Q_2} = 0.6,$$

which does not satisfy formula (1)) shown in FIG. 8, the light-receiving efficiency is less than 30% at 0 degree; when the light source is incident at 0 to 10 degrees, the extreme value is less than 30% (i.e., the light-receiving efficiency is less than 30%); that is, the light intensity received by the photosensitive element is insufficient. Therefore, it may be determined that the image module of Comparative Example 1 does not have good image quality.

Figure 9:
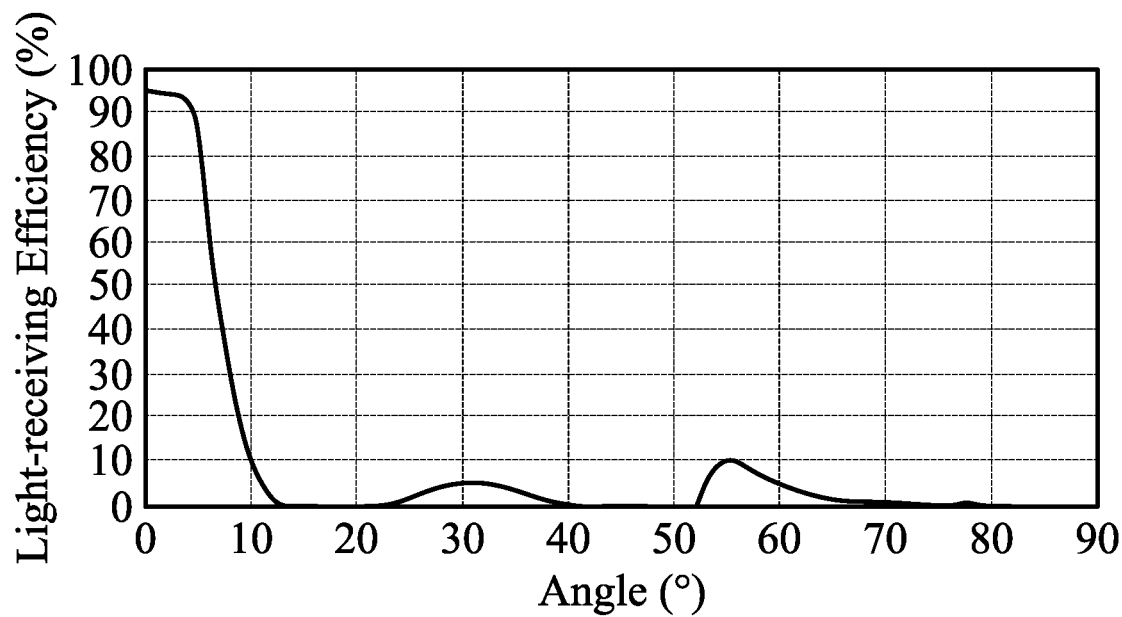
FIG. 9 shows the angular screening distribution curve of the image module made according to the specific specifications of Embodiment 3.

FIG. 9 shows the angular screening distribution curve of the image module made according to the specific specifications of Embodiment 3 (the structure of the image module of Embodiment 3 may refer to the image module 100 shown in FIG. 1 and FIG. 2). As the results of the angular screening distribution curve of Embodiment 3

$$(\sqrt[2]{Q_1 \times Q_2} = 1.8,$$

which satisfies formula (1)) shown in FIG. 9, when the light source is incident at 0 to 10 degrees, the extreme value of the light-receiving efficiency reaches 95% (i.e., the light-receiving efficiency is greater than 30%); the beam angle of the main signal is less than 10 degrees. Although noise interferences occur at about 30 degrees and about 55 degrees, the noise intensities are less than 10% of the main signal. Therefore, it may still be determined that the image module of Embodiment 3 has good image quality.

Figure 10:
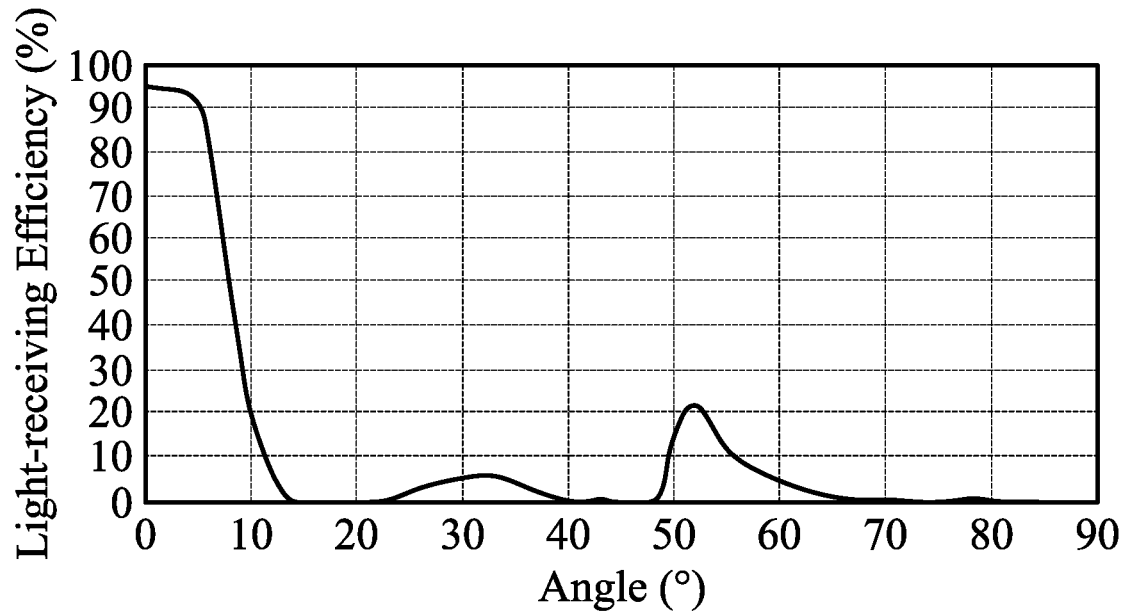
FIG. 10 shows the angular screening distribution curve of the image module made according to the specific specifications of Comparative Example 2.

FIG. 10 shows the angular screening distribution curve of the image module made according to the specific specifications of Comparative Example 2. As the results of the angular screening distribution curve of Comparative Example 2

$$(\sqrt[2]{Q_1 \times Q_2} = 2,$$

which does not satisfy formula (1)) shown in FIG. 10, when the light source is incident at 0 to 10 degrees, the extreme value of the light-receiving efficiency reaches 95%. However, noise interferences occur at about 30 degrees and about 52 degrees, and the noise intensities are greater than 10% of the main signal (i.e., cross talk occurs) at about 52 degrees. Therefore, it may be determined that the image module of Comparative Example 2 does not have good image quality.

The specific specifications of Embodiment 5 to Embodiment 8 may be referred to Table 3 below, and all embodiments satisfy the aforementioned formula (1) and formula (4). In particular, the structures of the image modules of Embodiment 5 and Embodiment 6 may refer to the image module 102 (defocus type, HS=−25) shown in FIG. 4, the structures of the image modules of Embodiment 7 and Embodiment 8 may refer to the image module 104 (defocus type, HS=+25) shown in FIG. 5, and all of Embodiment 5 to Embodiment 8 satisfy the aforementioned formula (1) and formula (4).

TABLE 3

|  | Embodiment 5 | Embodiment 6 | Embodiment 7 | Embodiment 8 |
| --- | --- | --- | --- | --- |
| N | 1.57 | 1.57 | 1.57 | 1.57 |
| P (μm) | 50 | 50 | 50 | 50 |
| R (μm) | 40 | 40 | 40 | 40 |
| D (μm) | 40 | 40 | 40 | 40 |
| LH (μm) | 5.36 | 5.36 | 5.36 | 5.36 |
| $H_1$ (μm) | 28.93 | 28.93 | 78.93 | 78.93 |
| $H_2$ (μm) | −16.1 | −16.1 | 48.93 | 48.93 |
| HS (μm) | −25 | −25 | 25 | 25 |
| $A_1$ (μm) | 11.7 | 11.7 | 31.86 | 31.86 |
| $A_2$ (μm) | 6.5 | 6.5 | 19.78 | 19.78 |
| $WO_1$ (μm) | 11.7 | 21.06 | 31.86 | 25.49 |
| $WO_2$ (μm) | 6.5 | 11.7 | 19.78 | 15.82 |
| $Q_1$ | 1 | 1.8 | 1 | 0.8 |
| $Q_2$ | 1 | 1.8 | 1 | 0.8 |
| $\sqrt[2]{Q_1 \times Q_2}$ | 1 | 1.8 | 1 | 0.8 |
| WS (μm) | 10 | 10 | 10 | 10 |

Figure 11:
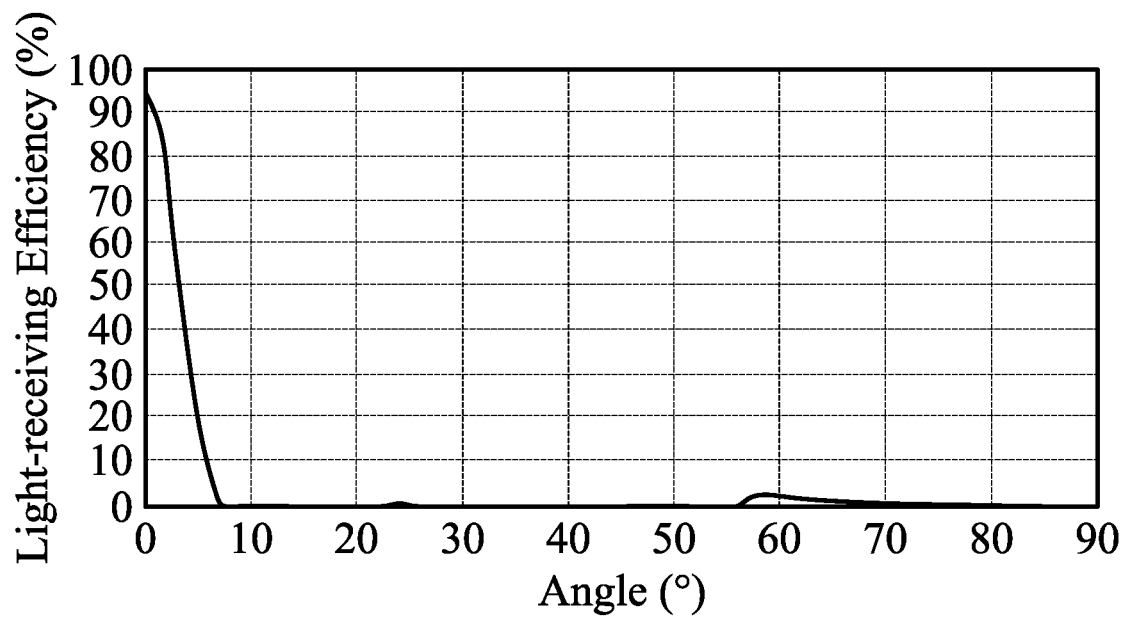
FIG. 11 shows the angular screening distribution curve of the image module made according to the specific specifications of Embodiment 6.

FIG. 11 shows the angular screening distribution curve of the image module made according to the specific specifications of Embodiment 6 (the structure of the image module of Embodiment 6 may refer to the image module 102 shown in FIG. 4). As the results of the angular screening distribution curve of Embodiment 6

$$(\sqrt[2]{Q_1 \times Q_2} = 1.8,$$

which satisfies formula (1) and is a critical value) shown in FIG. 11, when the light source is incident at 0 to 10 degrees, the extreme value of the light-receiving efficiency reaches 90% (i.e., the light-receiving efficiency is greater than 30%); the beam angle of the main signal is less than 10 degrees; and the noise at 10 to 90 degrees is less than 10%. Therefore, it may be determined that the image module of Embodiment 6 has good image quality.

Figure 12:
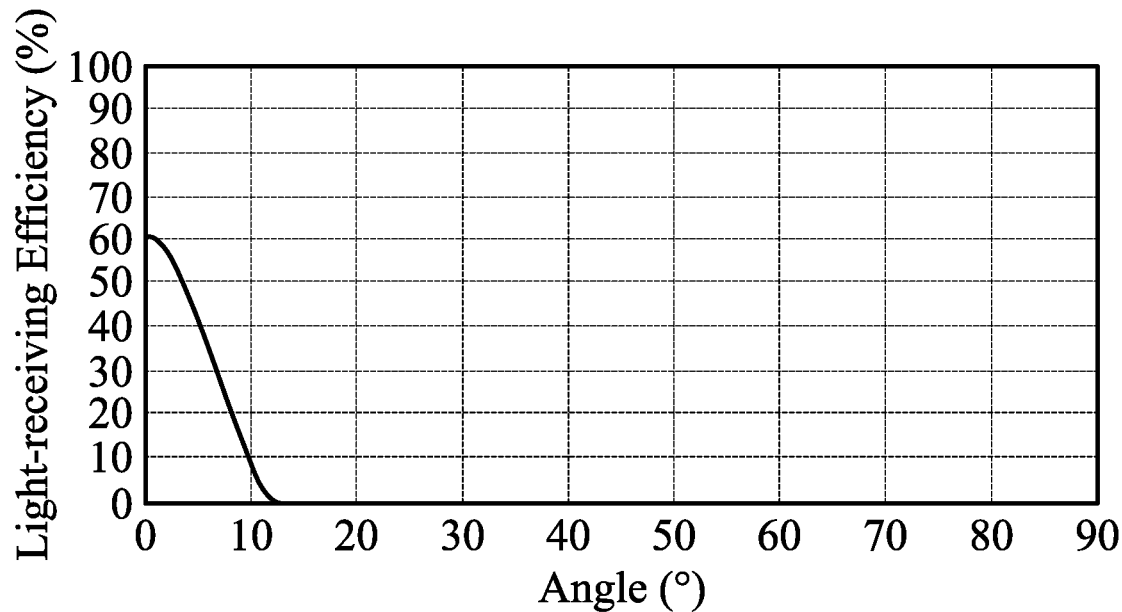
FIG. 12 shows the angular screening distribution curve of the image module made according to the specific specifications of Embodiment 8.

FIG. 12 shows the angular screening distribution curve of the image module made according to the specific specifications of Embodiment 8 (the structure of the image module of Embodiment 8 may refer to the image module 104 shown in FIG. 5). As the results of the angular screening distribution curve of Embodiment 8

$$\left(\sqrt[2]{Q_1 \times Q_2} = 0.8,\right.$$

which satisfies formula (1)) shown in FIG. 12, when the light source is incident at 0 to 10 degrees, the extreme value of the light-receiving efficiency reaches 60% (i.e., the light-receiving efficiency is greater than 30%); the beam angle of the main signal is less than 10 degrees; and the noise at 10 to 90 degrees is less than 10%. Therefore, it may be determined that the image module of Embodiment 8 has good image quality.

It should be noted that although in the foregoing embodiments, the number of light-shielding layers is described as two layers (i.e., the first light-shielding layer 31 and the second light-shielding layer 32), but the present disclosure is not limited thereto.

Figure 13:
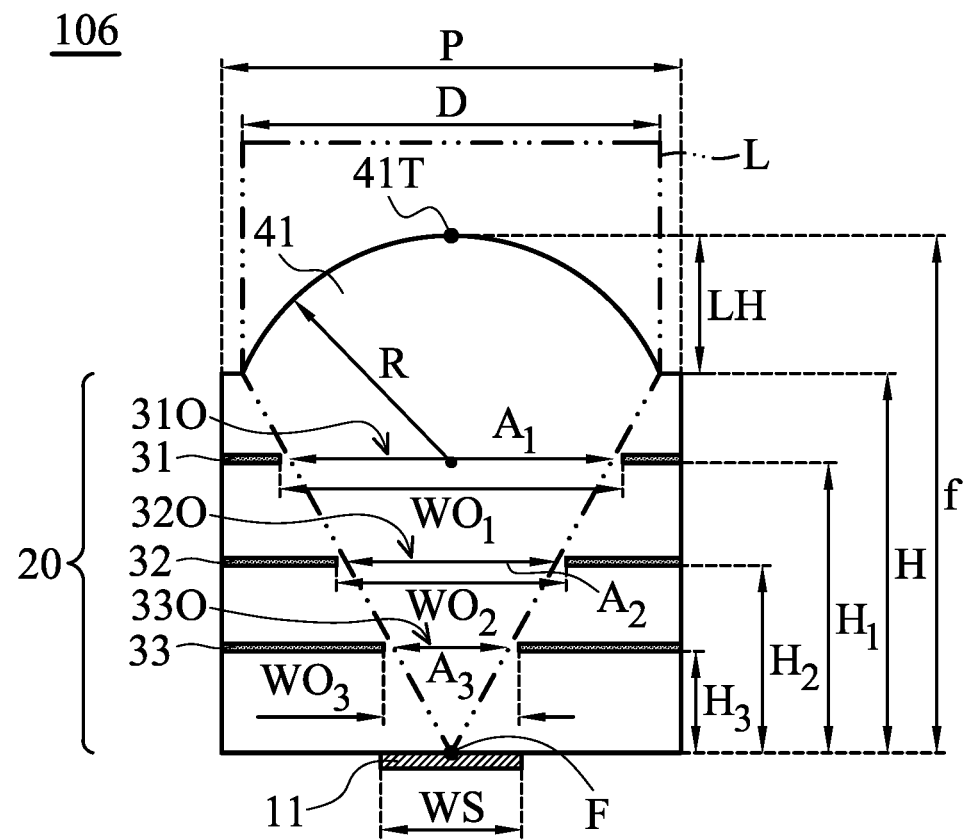
FIG. 13 is a partial cross-sectional view illustrating an image module according to another embodiment of the present disclosure.

FIG. 13 is a partial cross-sectional view illustrating an image module 106 according to another embodiment of the present disclosure. The difference from the image module 100 shown in FIG. 1 and FIG. 2 is that the image module 106 shown in FIG. 13 may further include a third light-shielding layer 33. The third light-shielding layer 33 is disposed in the light-transmitting layer 20, and the third light-shielding layer 33 is disposed between the second light-shielding layer 32 and the photosensitive element 11. In some embodiments, the material of the third light-shielding layer 33 may be the same as or similar to the material of the first light-shielding layer 31 or the material of the second light-shielding layer 32, but the present disclosure is not limited thereto. Moreover, as shown in FIG. 13, the third light-shielding layer 33 may have a third light passage portion 33O, the aperture of the third light passage portion 33O is $WO_3$, and the distance between the third light-shielding layer 33 and the focal point F of the condensing structure 41 is $H_3$. The aperture $WO_1$ is larger than or equal to the aperture $WO_2$, and the aperture $WO_2$ is larger than or equal to the aperture $WO_3$ ($WO_1 \geq WO_2 \geq WO_3$), the center of aperture $WO_1$ is aligned with the center of the aperture $WO_2$ and the center of the aperture $WO_3$, and the arc apex 41T of the condensing structure 41 (micro-lens), the center of the aperture $WO_1$, the center of the aperture $WO_2$, the center of the aperture $WO_3$, the center of the photosensitive element 11, and the focal point F of the concentrated beams L are aligned with each other and located on the same axis. The photosensitive element 11 is at the focal point F, which is referred to as a focus-type (HS=0) image module 106. The width of the concentrated beam L at the first light-shielding layer 31 is $A_1$, the width of the concentrated beam L at the second light-shielding layer 32 is $A_2$, the width of the concentrated beam L at the third light-shielding layer 33 is $A_3$, the ratio of $WO_1$ to $A_1$ is $Q_1$ $$\left(\text{i.e., } Q_1 = \frac{WO_1}{A_1}\right),$$

the ratio of $WO_2$ to $A_2$ is $Q_2$ $$\left(\text{i.e., } Q_2 = \frac{WO_2}{A_2}\right),$$

the ratio of $WO_3$ to $A_3$ is $Q_3$ $$\left(\text{i.e., } Q_3 = \frac{WO_3}{A_3}\right),$$

and the geometric mean of $Q_1$, $Q_2$ and $Q_3$ is greater than 0.6 and less than or equal to 1.8

$$\left(0.6 < \sqrt[3]{Q_1 \times Q_2 \times Q_3} \leq 1.8\right),$$

which satisfies the foregoing formula (1).

The specific specifications of Embodiment 9 to Embodiment 12 may be referred to Table 4 below, and all embodiments satisfy the aforementioned formula (1). In particular, the structures of the image modules of Embodiment 9 to Embodiment 12 may refer to the image module 106 (three light-shielding layers and focus type, HS=0) shown in FIG. 13, and all of Embodiment 9 to Embodiment 12 satisfy the aforementioned formula (1).

TABLE 4

|  | Embodiment 9 | Embodiment 10 | Embodiment 11 | Embodiment 12 |
|---|---|---|---|---|
| N | 1.57 | 1.57 | 1.57 | 1.57 |
| P (μm) | 50 | 50 | 50 | 50 |
| R (μm) | 40 | 40 | 40 | 40 |
| D (μm) | 40 | 40 | 40 | 40 |
| LH (μm) | 5.36 | 5.36 | 5.36 | 5.36 |
| $H_1$ (μm) | 78.93 | 78.93 | 78.93 | 78.93 |
| $H_2$ (μm) | 48.93 | 48.93 | 48.93 | 48.93 |
| $H_3$ (μm) | 18.93 | 18.93 | 18.93 | 18.93 |
| HS (μm) | 0 | 0 | 0 | 0 |
| $A_1$ (μm) | 31.92 | 31.92 | 31.92 | 31.92 |
| $A_2$ (μm) | 19.78 | 19.78 | 19.78 | 19.78 |
| $A_3$ (μm) | 7.66 | 7.66 | 7.66 | 7.66 |
| $WO_1$ (μm) | 31.92 | 25.54 | 47.88 | 19.78 |
| $WO_2$ (μm) | 19.78 | 15.82 | 29.67 | 19.78 |
| $WO_3$ (μm) | 7.66 | 6.12 | 11.49 | 19.78 |
| $Q_1$ | 1 | 0.8 | 1.5 | 0.62 |
| $Q_2$ | 1 | 0.8 | 1.5 | 1 |
| $Q_3$ | 1 | 0.8 | 1.5 | 1.57 |

TABLE 4-continued

| | Embodiment 9 | Embodiment 10 | Embodiment 11 | Embodiment 12 |
|---|---|---|---|---|
| $\sqrt[3]{Q_1 \times Q_2 \times Q_3}$ | 1 | 0.8 | 1.5 | 0.99 |
| WS (μm) | 30 | 30 | 30 | 30 |

The specific specifications of Comparative Example 4 to Comparative Example 7 may be referred to Table 5 below, and all comparative examples do not satisfy the aforementioned formula (1). In particular, the structures of the image modules of Comparative Example 4 to Comparative Example 7 may refer to the image module 106 shown in FIG. 13, but all of Comparative Example 4 to Comparative Example 7 do not satisfy the aforementioned formula (1).

TABLE 5

| | Comparative Example 4 | Comparative Example 5 | Comparative Example 6 | Comparative Example 7 |
|---|---|---|---|---|
| N | 1.57 | 1.57 | 1.57 | 1.57 |
| P (μm) | 50 | 50 | 50 | 50 |
| R (μm) | 40 | 40 | 40 | 40 |
| D (μm) | 40 | 40 | 40 | 40 |
| LH (μm) | 5.36 | 5.36 | 5.36 | 5.36 |
| $H_1$ (μm) | 78.93 | 78.93 | 78.93 | 78.93 |
| $H_2$ (μm) | 48.93 | 48.93 | 48.93 | 48.93 |
| $H_3$ (μm) | 18.93 | 18.93 | 18.93 | 18.93 |
| HS (μm) | 0 | 0 | 0 | 0 |
| $A_1$ (μm) | 31.92 | 31.92 | 31.92 | 31.92 |
| $A_2$ (μm) | 19.78 | 19.78 | 19.78 | 19.78 |
| $A_3$ (μm) | 7.66 | 7.66 | 7.66 | 7.66 |
| $WO_1$ (μm) | 19.15 | 60.65 | 31.92 | 7.66 |
| $WO_2$ (μm) | 11.68 | 37.58 | 31.92 | 7.66 |
| $WO_3$ (μm) | 4.6 | 15.55 | 31.92 | 7.66 |
| $Q_1$ | 0.6 | 1.9 | 1 | 0.24 |
| $Q_2$ | 0.6 | 1.9 | 1.61 | 0.39 |
| $Q_3$ | 0.6 | 1.9 | 4.17 | 1 |
| $\sqrt[3]{Q_1 \times Q_2 \times Q_3}$ | 0.6 | 1.9 | 1.89 | 0.45 |
| WS (μm) | 30 | 30 | 30 | 30 |

Figure 14:
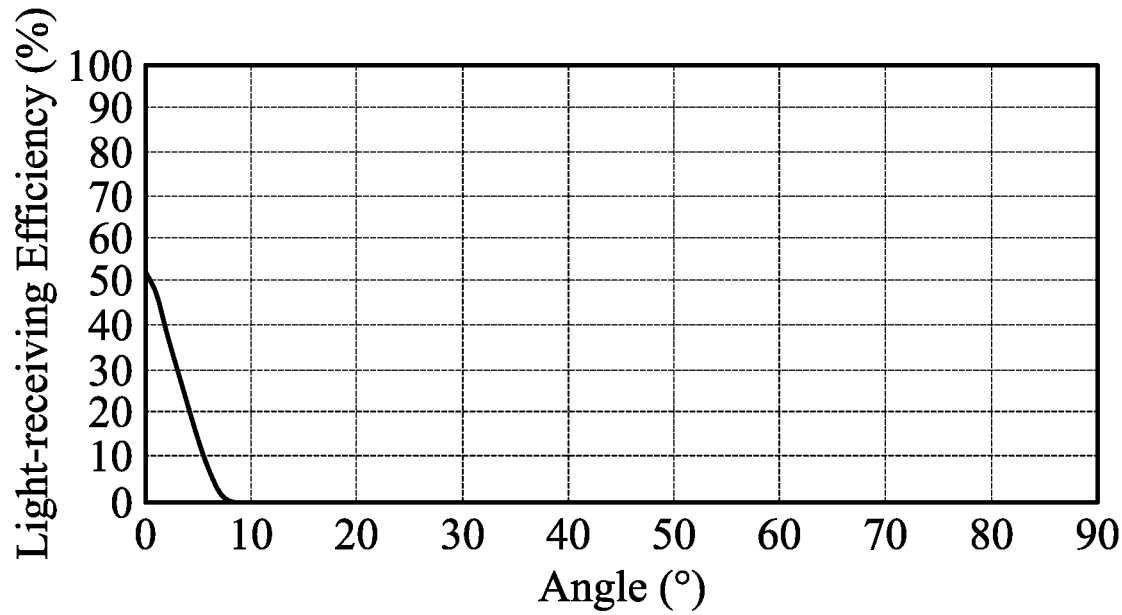
FIG. 14 shows the angular screening distribution curve of the image module made according to the specific specifications of Embodiment 10.

FIG. 14 shows the angular screening distribution curve of the image module made according to the specific specifications of Embodiment 10 (the structure of the image module of Embodiment 10 may refer to the image module 106 shown in FIG. 13). As the results of the angular screening distribution curve of Embodiment 10

$$\left(\sqrt[3]{Q_1 \times Q_2 \times Q_3} = 0.8,\right.$$

which satisfies formula (1)) shown in FIG. 14, when the light source is incident at 0 to 10 degrees, the extreme value of the light-receiving efficiency reaches 50% (i.e., the light-receiving efficiency is greater than 30%); the beam angle of the main signal is less than 10 degrees; and the noise at 10 to 90 degrees is less than 10%. Therefore, it may be determined that the image module of Embodiment 10 has good image quality.

Figure 15:
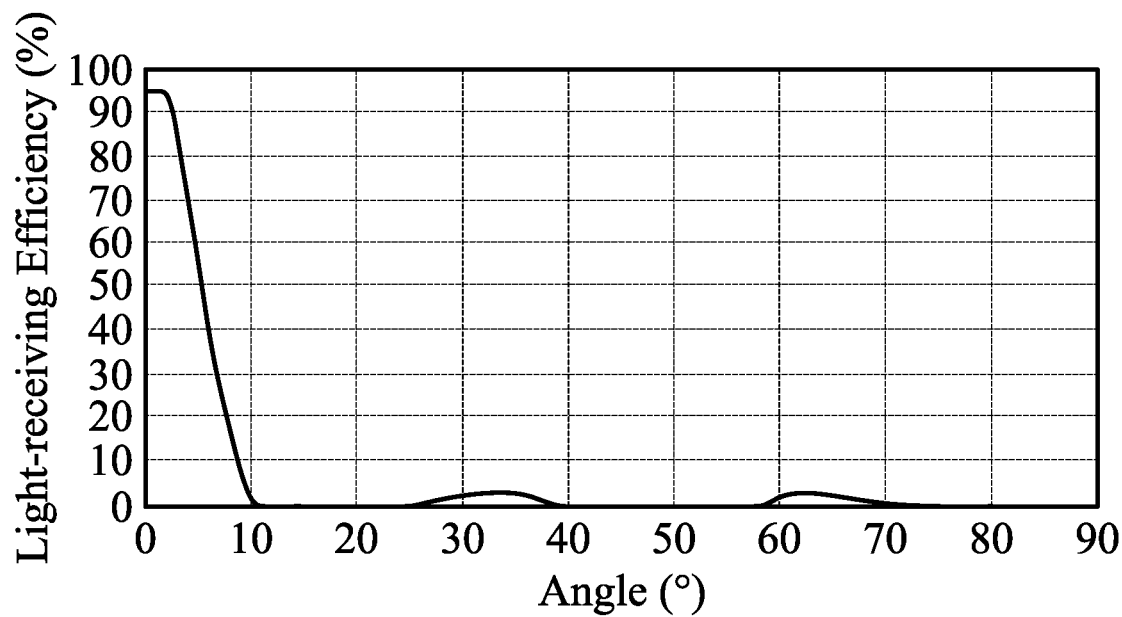
FIG. 15 shows the angular screening distribution curve of the image module made according to the specific specifications of Embodiment 11.

FIG. 15 shows the angular screening distribution curve of the image module made according to the specific specifications of Embodiment 11 (the structure of the image module of Embodiment 11 may refer to the image module 106 shown in FIG. 13). As the results of the angular screening distribution curve of Embodiment 11

$$\left(\sqrt[3]{Q_1 \times Q_2 \times Q_3} = 1.5,\right.$$

which satisfies formula (1)) shown in FIG. 15, when the light source is incident at 0 to 10 degrees, the extreme value of the light-receiving efficiency reaches 95% (i.e., the light-receiving efficiency is greater than 30%); the beam angle of the main signal is less than 10 degrees. Although noise interferences occur at about 34 degrees and about 62 degrees, the noise intensities are less than 10% of the main signal. Therefore, it may still be determined that the image module of Embodiment 11 has good image quality.

Figure 16:
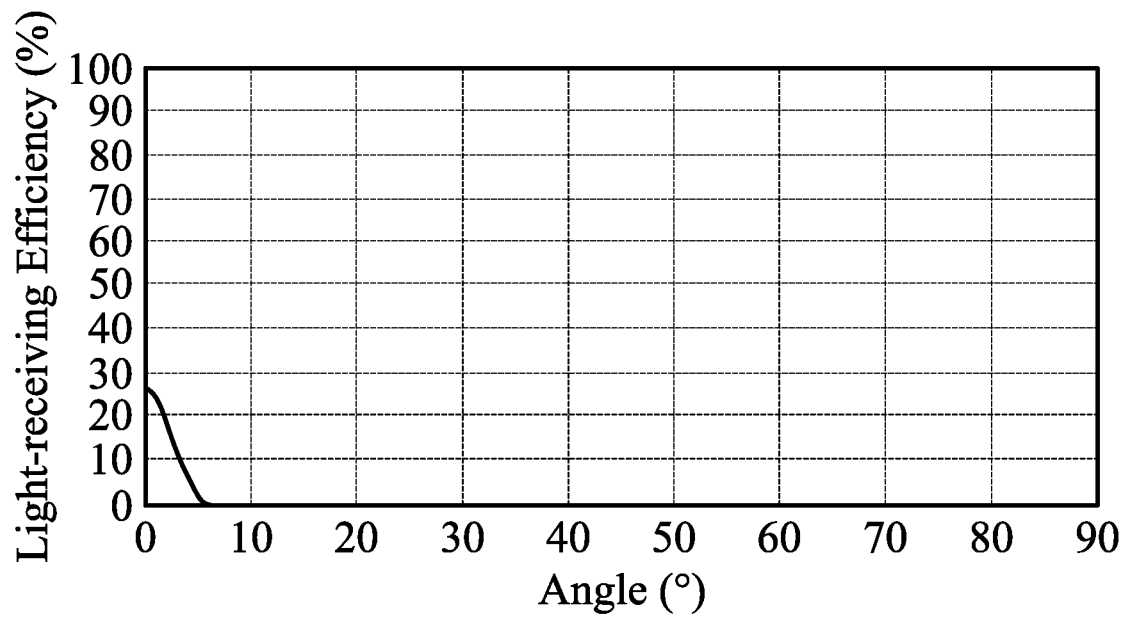
FIG. 16 shows the angular screening distribution curve of the image module made according to the specific specifications of Comparative Example 4.

FIG. 16 shows the angular screening distribution curve of the image module made according to the specific specifications of Comparative Example 4. As the results of the angular screening distribution curve of Comparative Example 4

$$\left(\sqrt[3]{Q_1 \times Q_2 \times Q_3} = 0.6,\right.$$

which is a critical value but does not satisfy formula (1)) shown in FIG. 16, when the light source is incident at 0 to 10 degrees, the extreme value is less than 30% (i.e., the light-receiving efficiency is less than 30%); that is, the light intensity received by the photosensitive element is insufficient. Therefore, it may be determined that the image module of Comparative Example 4 does not have good image quality.

Figure 17:
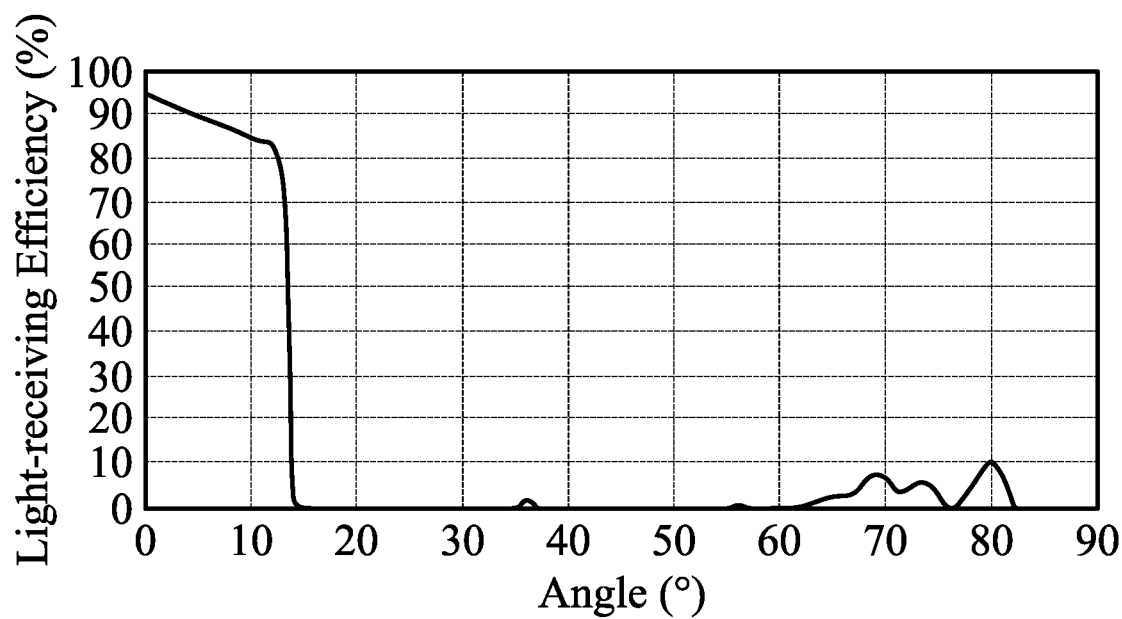
FIG. 17 shows the angular screening distribution curve of the image module made according to the specific specifications of Comparative Example 6.

FIG. 17 shows the angular screening distribution curve of the image module made according to the specific specifications of Comparative Example 6. As the results of the angular screening distribution curve of Comparative Example 6

$$\left(\sqrt[3]{Q_1 \times Q_2 \times Q_3} = 1.89,\right.$$

which does not satisfy formula (1)) shown in FIG. 17, when the light source is incident at 0 to 10 degrees, the extreme value of the light-receiving efficiency reaches 95%. However, the beam angle of the main signal is greater than 10 degrees, and the light-receiving efficiency remains 80% at 10 degrees, which may cause cross talk. Therefore, it may be determined that the image module of Comparative Example 6 does not have good image quality.

Figure 18:
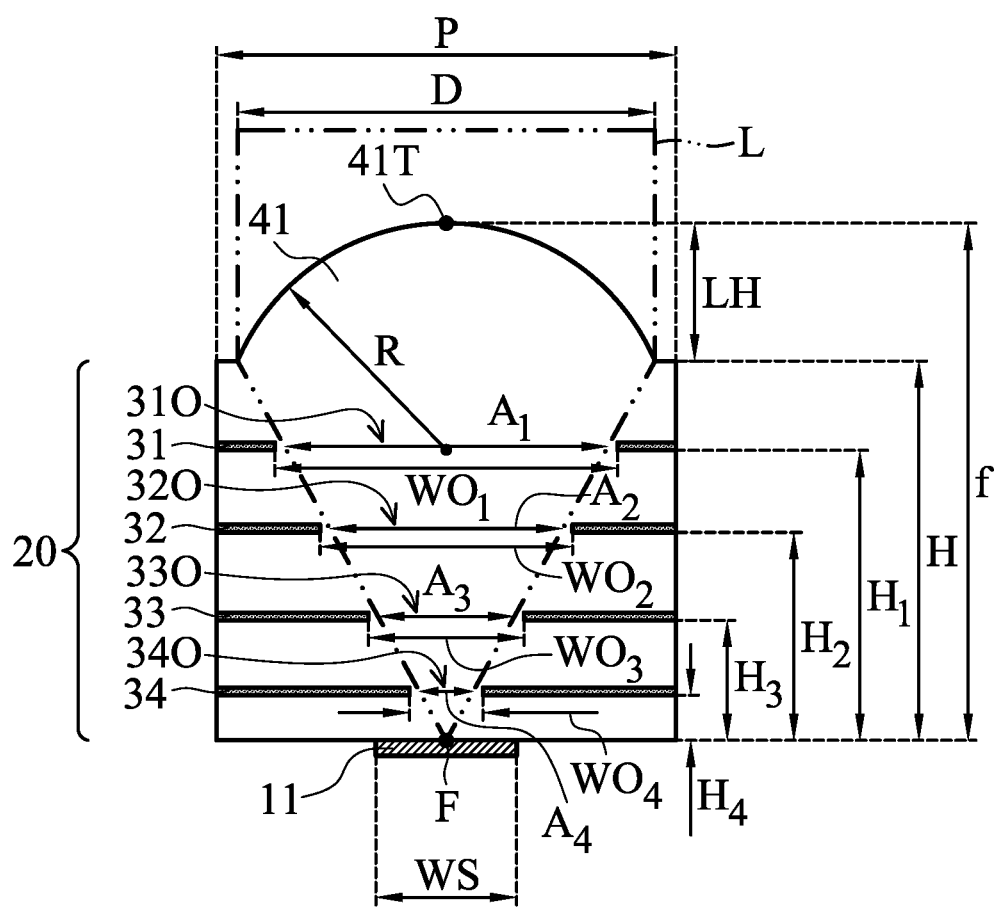
FIG. 18 is a partial cross-sectional view illustrating an image module according to still another embodiment of the present disclosure.

FIG. 18 is a partial cross-sectional view illustrating an image module 108 according to still another embodiment of the present disclosure. The difference from the image module 106 shown in FIG. 13 is that the image module 108 shown in FIG. 18 may further include a fourth light-shielding layer 34. The fourth light-shielding layer 34 is disposed in the light-transmitting layer 20, and the fourth light-shielding layer 34 is disposed between the third light-shielding layer 33 and the photosensitive element 11. In some embodiments, the material of the fourth light-shielding layer 34 may be the same as or similar to the material of the first light-shielding layer 31, the material of the second light-shielding layer 32 or the material of the third light-shielding layer 33, but the present disclosure is not limited thereto. Moreover, as shown in FIG. 18, the fourth light-shielding layer 34 may have a fourth light passage portion 34O, the aperture of the fourth light passage portion 34O is $WO_4$, and the distance between the fourth light-shielding layer 34 and the focal point F of the condensing structure 41 is $H_4$. The aperture $WO_1$ is larger than or equal to the aperture $WO_2$, the aperture $WO_2$ is larger than or equal to the aperture $WO_3$, and the aperture $WO_3$ is larger than or equal to the aperture $WO_4$ ($WO_1 \geq WO_2 \geq WO_3 \geq WO_4$), the center of aperture $WO_1$ is aligned with the center of the aperture $WO_2$, the center of the aperture $WO_3$ and the center of the aperture $WO_4$, and the arc apex 41T of the condensing structure 41 (micro-lens), the center of the aperture $WO_1$, the center of the aperture $WO_2$, the center of the aperture $WO_3$, the center of the aperture $WO_4$, the center of the photosensitive element 11, and the focal point F of the concentrated beams L are aligned with each other and located on the same axis. The photosensitive element 11 is at the focal point F, which is referred to as a focus-type (HS=0) image module 108. The width of the concentrated beam L at the first light-shielding layer 31 is $A_1$, the width of the concentrated beam L at the second light-shielding layer 32 is $A_2$, the width of the concentrated beam L at the third light-shielding layer 33 is $A_3$, the width of the concentrated beam L at the fourth light-shielding layer 34 is $A_4$, the ratio of $WO_1$ to $A_1$ is $Q_1$ $$\left(\text{i.e., } Q_1 = \frac{WO_1}{A_1}\right),$$

the ratio of $WO_2$ to $A_2$ is $Q_2$ $$\left(\text{i.e., } Q_2 = \frac{WO_2}{A_2}\right),$$

the ratio of $WO_3$ to $A_3$ is $Q_3$ $$\left(\text{i.e., } Q_3 = \frac{WO_3}{A_3}\right),$$

the ratio of $WO_4$ to $A_4$ is $Q_4$ $$\left(\text{i.e., } Q_4 = \frac{WO_4}{A_4}\right),$$

and the geometric mean of $Q_1$, $Q_2$, $Q_3$ and $Q_4$ is greater than 0.6 and less than or equal to 1.8

$$\left(0.6 < \sqrt[4]{Q_1 \times Q_2 \times Q_3 \times Q_4} \leq 1.8\right),$$

which satisfies the foregoing formula (1).

The specific specifications of Embodiment 13 to Embodiment 16 may be referred to Table 6 below, and all embodiments satisfy the aforementioned formula (1). In particular, the structures of the image modules of Embodiment 13 to Embodiment 16 may refer to the image module 108 (four light-shielding layers and focus type, HS=0) shown in FIG. 18, and all of Embodiment 13 to Embodiment 16 satisfy the aforementioned formula (1).

TABLE 6

|  | Embodiment 13 | Embodiment 14 | Embodiment 15 | Embodiment 16 |
|---|---|---|---|---|
| N | 1.57 | 1.57 | 1.57 | 1.57 |
| P (μm) | 50 | 50 | 50 | 50 |
| R (μm) | 40 | 40 | 40 | 40 |
| D (μm) | 40 | 40 | 40 | 40 |
| LH (μm) | 5.36 | 5.36 | 5.36 | 5.36 |
| $H_1$ (μm) | 78.93 | 78.93 | 78.93 | 78.93 |
| $H_2$ (μm) | 58.93 | 58.93 | 58.93 | 58.93 |
| $H_3$ (μm) | 38.93 | 38.93 | 38.93 | 38.93 |
| $H_4$ (μm) | 18.93 | 18.93 | 18.93 | 18.93 |
| HS (μm) | 0 | 0 | 0 | 0 |
| $A_1$ (μm) | 31.92 | 31.92 | 31.92 | 31.92 |
| $A_2$ (μm) | 23.82 | 23.82 | 23.82 | 23.82 |
| $A_3$ (μm) | 15.74 | 15.74 | 15.74 | 15.74 |
| $A_4$ (μm) | 7.66 | 7.66 | 7.66 | 7.66 |
| $WO_1$ (μm) | 31.92 | 25.54 | 54.26 | 23.82 |
| $WO_2$ (μm) | 23.82 | 19.06 | 40.49 | 23.82 |
| $WO_3$ (μm) | 15.74 | 12.59 | 26.76 | 15.74 |
| $WO_4$ (μm) | 7.66 | 6.12 | 13.02 | 15.74 |
| $Q_1$ | 1 | 0.8 | 1.7 | 0.75 |
| $Q_2$ | 1 | 0.8 | 1.7 | 1 |
| $Q_3$ | 1 | 0.8 | 1.7 | 1 |
| $Q_4$ | 1 | 0.8 | 1.7 | 2.1 |
| $\sqrt[4]{Q_1 \times Q_2 \times Q_3 \times Q_4}$ | 1 | 0.8 | 1.7 | 1.13 |
| WS (μm) | 30 | 30 | 30 | 30 |

The specific specifications of Comparative Example 8 to Comparative Example 11 may be referred to Table 7 below, and all comparative examples do not satisfy the aforementioned formula (1). In particular, the structures of the image modules of Comparative Example 8 to Comparative Example 11 may refer to the image module 108 shown in FIG. 18, but all of Comparative Example 8 to Comparative Example 11 do not satisfy the aforementioned formula (1). The geometric averages (0.6, 1.83) of the Qn values of Comparative Example 8 and Comparative Example 10 are close to the upper and lower critical values of formula (1), respectively.

TABLE 7

|  | Comparative Example 8 | Comparative Example 9 | Comparative Example 10 | Comparative Example 11 |
|---|---|---|---|---|
| N | 1.57 | 1.57 | 1.57 | 1.57 |
| P (μm) | 50 | 50 | 50 | 50 |
| R (μm) | 40 | 40 | 40 | 40 |
| D (μm) | 40 | 40 | 40 | 40 |
| LH (μm) | 5.36 | 5.36 | 5.36 | 5.36 |
| $H_1$ (μm) | 78.93 | 78.93 | 78.93 | 78.93 |
| $H_2$ (μm) | 58.93 | 58.93 | 58.93 | 58.93 |
| $H_3$ (μm) | 38.93 | 38.93 | 38.93 | 38.93 |
| $H_4$ (μm) | 18.93 | 18.93 | 18.93 | 18.93 |
| HS (μm) | 0 | 0 | 0 | 0 |
| $A_1$ (μm) | 31.92 | 31.92 | 31.92 | 31.92 |
| $A_2$ (μm) | 23.82 | 23.82 | 23.82 | 23.82 |
| $A_3$ (μm) | 15.74 | 15.74 | 15.74 | 15.74 |
| $A_4$ (μm) | 7.66 | 7.66 | 7.66 | 7.66 |
| $WO_1$ (μm) | 19.15 | 63.84 | 31.92 | 7.66 |
| $WO_2$ (μm) | 14.29 | 47.64 | 31.92 | 7.66 |
| $WO_3$ (μm) | 9.44 | 31.48 | 31.92 | 7.66 |
| $WO_4$ (μm) | 4.6 | 15.32 | 31.92 | 7.66 |
| $Q_1$ | 0.6 | 2 | 1 | 0.24 |
| $Q_2$ | 0.6 | 2 | 1.34 | 0.32 |
| $Q_3$ | 0.6 | 2 | 2.03 | 0.49 |
| $Q_4$ | 0.6 | 2 | 4.17 | 1 |
| $\sqrt[4]{Q_1 \times Q_2 \times Q_3 \times Q_4}$ | 0.6 | 2 | 1.83 | 0.44 |
| WS (μm) | 30 | 30 | 30 | 30 |

Figure 19:
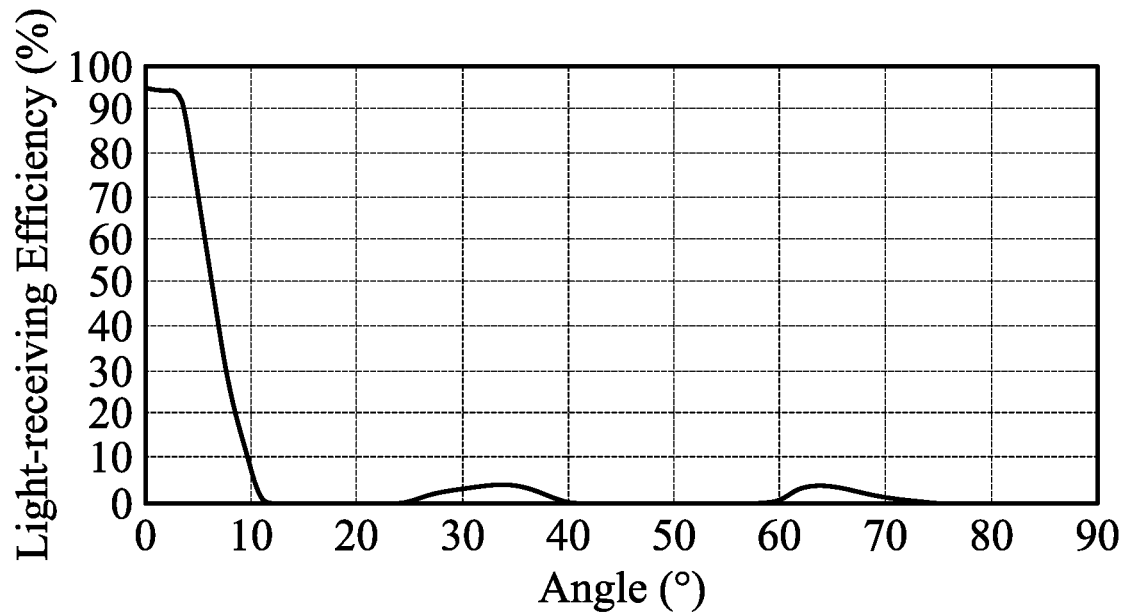
FIG. 19 shows the angular screening distribution curve of the image module made according to the specific specifications of Embodiment 15.

FIG. 19 shows the angular screening distribution curve of the image module made according to the specific specifications of Embodiment 15 (the structure of the image module of Embodiment 15 may refer to the image module 108 shown in FIG. 18). As the results of the angular screening distribution curve of Embodiment 15

$$\left(\sqrt[3]{Q_1 \times Q_2 \times Q_3 \times Q_4}\right) = 1.7,$$

which satisfies formula (1)) shown in FIG. 19, when the light source is incident at 0 to 10 degrees, the extreme value of the light-receiving efficiency reaches 95% (i.e., the light-receiving efficiency is greater than 30%); the beam angle of the main signal is less than 10 degrees. Although noise interferences occur at about 33 degrees and about 62 degrees, the noise intensities are less than 10% of the main signal. Therefore, it may still be determined that the image module of Embodiment 15 has good image quality.

Figure 20:
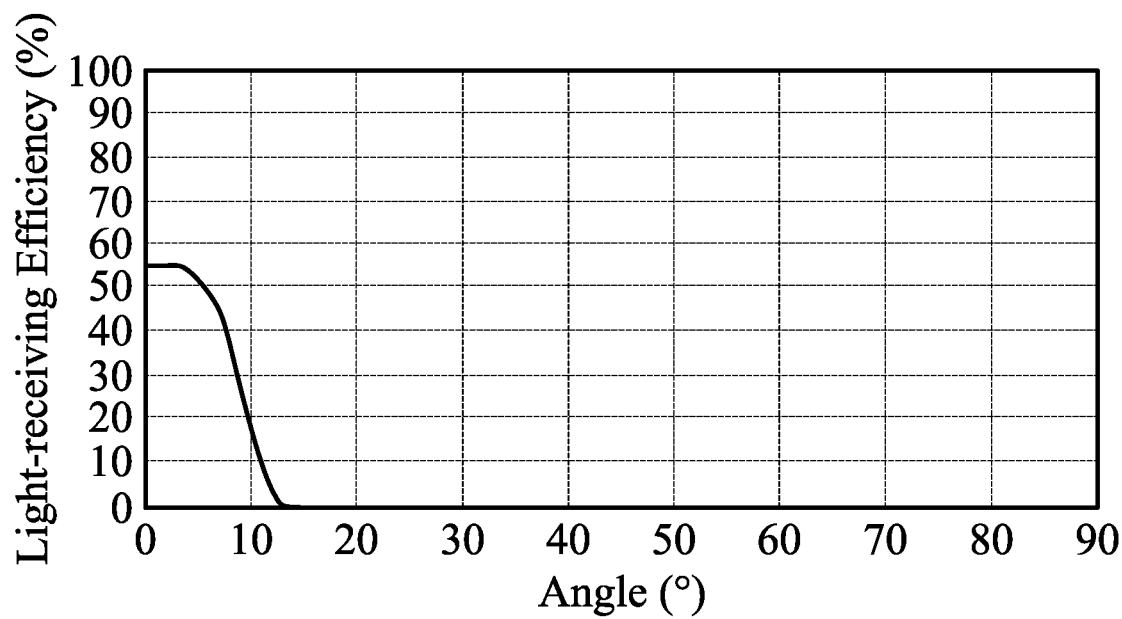
FIG. 20 shows the angular screening distribution curve of the image module made according to the specific specifications of Embodiment 16.

FIG. 20 shows the angular screening distribution curve of the image module made according to the specific specifications of Embodiment 16 (the structure of the image module of Embodiment 16 may refer to the image module 108 shown in FIG. 18). As the results of the angular screening distribution curve of Embodiment 16

$$\left(\sqrt[3]{Q_1 \times Q_2 \times Q_3 \times Q_4}\right) = 1.13,$$

which satisfies formula (1)) shown in FIG. 20, when the light source is incident at 0 to 10 degrees, the extreme value of the light-receiving efficiency reaches 55% (i.e., the light-receiving efficiency is greater than 30%); the beam angle of the main signal is less than 10 degrees; and the noise at 10 to 90 degrees is less than 10%. Therefore, it may be determined that the image module of Embodiment 16 has good image quality.

Figure 21:
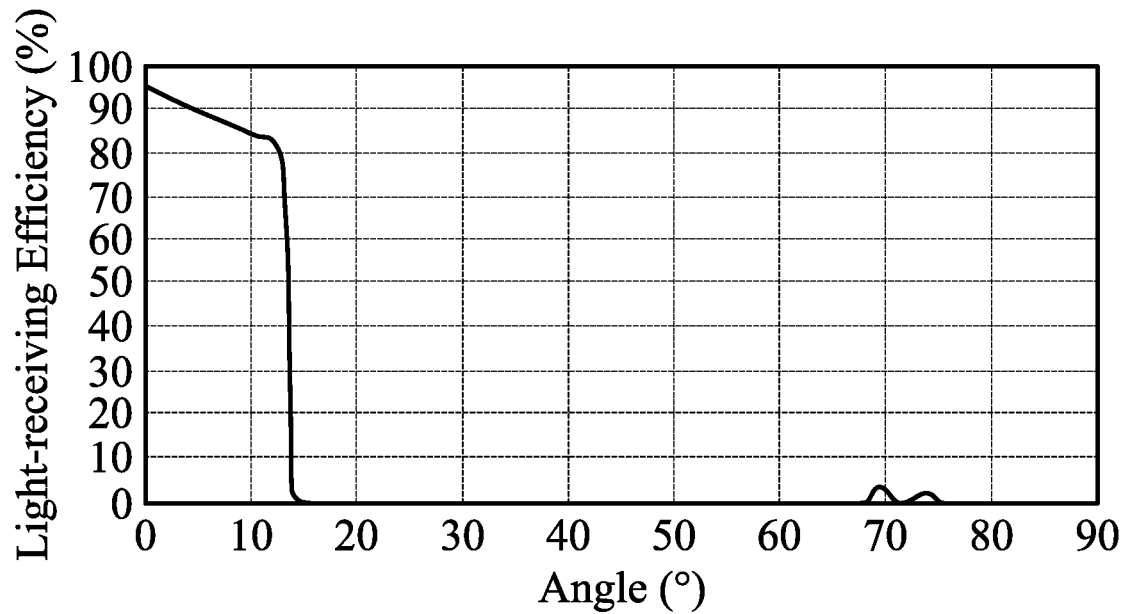
FIG. 21 shows the angular screening distribution curve of the image module made according to the specific specifications of Comparative Example 10.

FIG. 21 shows the angular screening distribution curve of the image module made according to the specific specifications of Comparative Example 10. As the results of the angular screening distribution curve of Comparative Example 10

$$\left(\sqrt[3]{Q_1 \times Q_2 \times Q_3 \times Q_4}\right) = 1.83,$$

which does not satisfy formula (1)) shown in FIG. 21, when the light source is incident at 0 to 10 degrees, the extreme value of the light-receiving efficiency reaches 95%. However, the beam angle of the main signal is greater than 10 degrees, and the light-receiving efficiency remains 80% at 10 degrees, which may cause cross talk. Therefore, it may be determined that the image module of Comparative Example 10 does not have good image quality.

Figure 22:
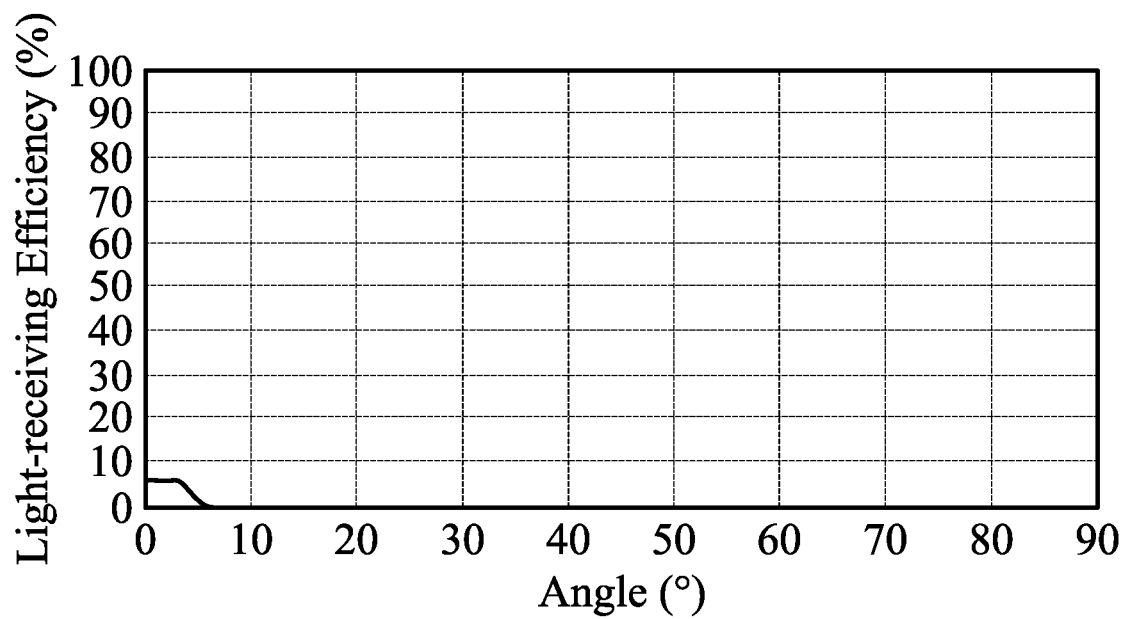
FIG. 22 shows the angular screening distribution curve of the image module made according to the specific specifications of Comparative Example 11.

FIG. 22 shows the angular screening distribution curve of the image module made according to the specific specifications of Comparative Example 11. As the results of the angular screening distribution curve of Comparative Example 11

$$\left(\sqrt[3]{Q_1 \times Q_2 \times Q_3 \times Q_4}\right) = 0.44,$$

which does not satisfy formula (1)) shown in FIG. 22, when the light source is incident at 0 to 10 degrees, the extreme value is less than 10% (i.e., the light-receiving efficiency is less than 30%); that is, the light intensity received by the photosensitive element is insufficient. Therefore, it may be determined that the image module of Comparative Example 11 does not have good image quality.

Figure 23:
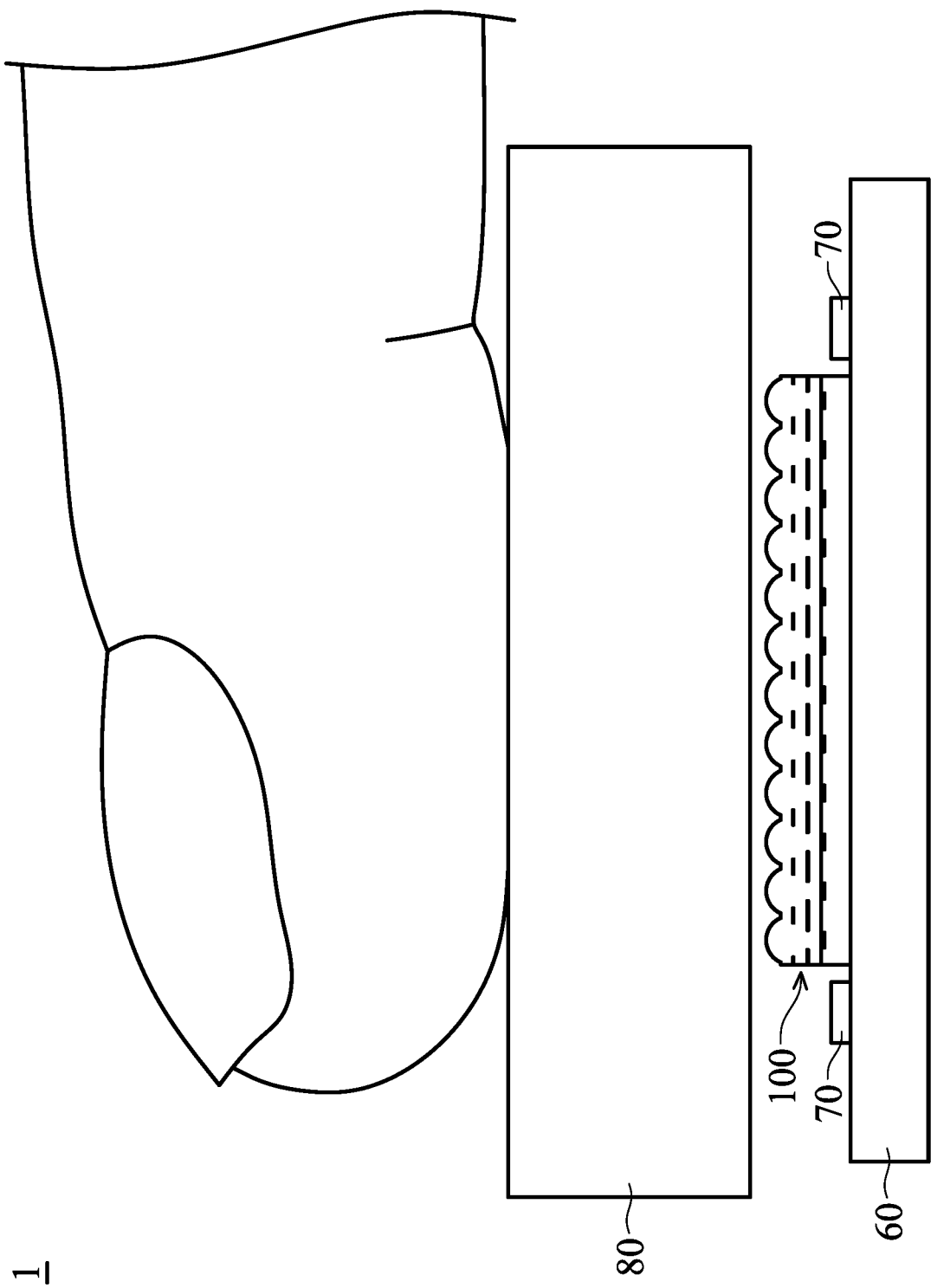
FIG. 23 is a partial cross-sectional view illustrating a biometric device according to one embodiment of the present disclosure.

FIG. 23 is a partial cross-sectional view illustrating a biometric device 1 according to one embodiment of the present disclosure. The biometric device 1 may be used to identify a part of an organism's characteristic, such as a fingerprint, a vein, or an iris, and so on. As shown in FIG. 23, the biometric device 1 may include a substrate 60, a light source 70 and the image module 100 shown in FIG. 1. The light source 70 is disposed on the substrate 60 for emitting light to an organism (e.g., the finger shown in FIG. 23), and the image module 100 may be used for receiving light from the light source 70. For example, the light source 70 may be, for example, a light-emitting diode that emits light to the characteristic points (e.g., a fingerprint) of an organism, and the characteristic points may reflect the light (or via other mechanisms, such as light-coupling and light-scattering) into the image module 100, so that the image module 100 may obtain an image of the characteristic points.

In some embodiments, the light source 70 may be disposed on at least one side of the image module 100. For example, the light source 70 may surround the image module 100, but the present disclosure is not limited thereto. It should be noted that the image module 100 shown in FIG. 23 may also be replaced with the image module 102 shown in FIG. 4, the image module 104 shown in FIG. 5, the image module 106 shown in FIG. 13 or the image module 108 shown in FIG. 18, which is not described in detail here.

Furthermore, although the embodiment shown in FIG. 23 is described by using a reflective biometric device, the present disclosure is not limited thereto. In other embodiments, depending on the position of the light source 70, the biometric device 1 may also be a penetrating type (light emitting from above the organism) or a scattering type (emitting light from the side of the organism).

In some embodiments, the biometric device 1 may further include a cover plate 80 disposed on the light source 70 and the image module 100. For example, the cover plate 80 may be a glass cover plate, but the present disclosure is not limited thereto.

In summary, the light-screening structure of the embodiments according to the present disclosure satisfies formula (1) and the distance between the focal point of the concentrated beam and the top surface of the photosensitive element satisfies formula (4), which may help to reduce the thickness of the image module and the thickness of the biometric device using the image module. Furthermore, it also helps to reduce cross talk to improve the accuracy of identifying the characteristic points of an organism.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An image module, comprising:
    a photosensitive element; and
    a light-screening structure disposed on the photosensitive element, wherein the light-screening structure comprises:
    a light-transmitting layer;
    a first light-shielding layer disposed in the light-transmitting layer and having a first light passage portion;
    a second light-shielding layer disposed in the light-transmitting layer and between the first light-shielding layer and the photosensitive element and having a second light passage portion; and
    a condensing structure disposed on the light-transmitting layer;
    wherein the first light passage portion and the second light passage portion correspond to the photosensitive element, light passing through the condensing structure produces a concentrated beam, and an aperture of the first light passage portion and an aperture of the second light passage portion are respectively adjusted according to a width of the concentrated beam at the first light-shielding layer and a width of the concentrated beam at the second light-shielding layer;
    wherein a focal point of the concentrated beam has a distance away from a top surface of the photosensitive element, a minimum width of the photosensitive element is WS, a focal length of the condensing structure is f, an outside diameter of the condensing structure is D, a maximum thickness of the condensing structure is LH, and the distance HS between the focal point of the concentrated beam and the top surface of the photosensitive element satisfies the following formula:

$$-\frac{WS \times (f-LH)}{D} \le HS \le \frac{WS \times (f-LH)}{D}.$$

2. The image module according to claim 1, wherein the aperture of the first light passage portion is $WO_1$, the aperture of the second light passage portion is $WO_2$, the width of the concentrated beam at the first light-shielding layer is $A_1$, the width of the concentrated beam at the second light-shielding layer is $A_2$, a ratio of $WO_1$ to $A_1$ is $Q_1$, a ratio of $WO_2$ to $A_2$ is $Q_2$, and a geometric mean of $Q_1$ and $Q_2$ is greater than 0.6 and less than or equal to 1.8.

3. The image module according to claim 1, wherein a focal length of the condensing structure is f, an outside diameter of the condensing structure is D, a maximum thickness of the condensing structure is LH, a distance between the first light-shielding layer and the focal point of the condensing structure is $H_1$, a distance between the second light-shielding layer and the focal point of the condensing structure is $H_2$, and the aperture $WO_1$ of the first light passage portion and the aperture $WO_2$ of the second light passage portion satisfy the following formulas:

$$0.6 \times \frac{D \times H_1}{f-LH} < WO_1 \le 1.8 \times \frac{D \times H_1}{f-LH}$$

$$0.6 \times \frac{D \times H_2}{f-LH} < WO_2 \le 1.8 \times \frac{D \times H_2}{f-LH}.$$

4. The image module according to claim 1, wherein the condensing structure is a micro-lens structure, a micro-pyramid structure, a micro-trapezoidal structure or a gradient-index structure.

5. An image module, comprising:
    a photosensitive array comprising a plurality of photosensitive elements; and
    a light-screening structure disposed on the photosensitive array, wherein the light-screening structure comprises:

a light-transmitting layer;

a plurality of light-shielding layers disposed in the light-transmitting layer and each having a plurality of light passage portions; and a condensing array disposed on the light-transmitting layer and having a plurality of condensing structures;

wherein the light passage portions correspond to the photosensitive elements, light passing through the condensing array produces a plurality of concentrated beams, and an aperture of each of the light passage portions is adjusted according to a width of a corresponding concentrated beam at each of the light-shielding layers;

wherein a focal length of each of the condensing structures is f, an outside diameter of each of the condensing structures is D, a maximum thickness of each of the condensing structures is LH, a minimum width of each of the photosensitive elements is WS, and a distance HS between a focal point of each of the concentrated beam and a top surface of a corresponding photosensitive element satisfies the following formula:

$$-\frac{WS \times (f - LH)}{D} \leq HS \leq \frac{WS \times (f - LH)}{D}.$$

6. The image module according to claim 5, wherein the light-screening structure comprises n light-shielding layers, n is a positive integer greater than or equal to 2, and in the n light-shielding layers, an aperture of each of the light passage portions in a k-th light-shielding layer is $WO_k$, a width of each of the concentrated beams at the k-th light-shielding layer is $A_k$, a ratio of $WO_k$ to $A_k$ is $Q_k$, k is a positive integer less than or equal to n, and the light-screening structure satisfies the following formula:

$$0.6 < \sqrt[k]{Q_1 \times Q_2 \times \ldots \times Q_k} \leq 1.8.$$

7. The image module according to claim 5, wherein the light-screening structure comprises n light-shielding layers, n is a positive integer greater than or equal to 2, and in then light-shielding layers, an aperture of each of the light passage portions in a k-th light-shielding layer is $WO_k$, a distance between and the k-th light-shielding layer and the focal point of each of the condensing structures is $H_k$, and the aperture $WO_k$ of each of the light passage portions satisfies the following formula:

$$0.6 \times \frac{D \times H_k}{f - LH} < WO_k \leq 1.8 \times \frac{D \times H_k}{f - LH}.$$

8. The image module according to claim 5, wherein the photosensitive array is a one-dimensional array or a two-dimensional array, and the condensing array is a one-dimensional array or a two-dimensional array.

9. A biometric device, comprising:

a substrate;

a light source disposed on the substrate for emitting light to an organism; and an image module for receiving light from the light source, wherein the image module comprises:

a photosensitive element; and a light-screening structure disposed on the photosensitive element, wherein the light-screening structure comprises:

a light-transmitting layer;

a first light-shielding layer disposed in the light-transmitting layer and having a first light passage portion;

a second light-shielding layer disposed in the light-transmitting layer and between the first light-shielding layer and the photosensitive element and having a second light passage portion; and a condensing structure disposed on the light-transmitting layer;

wherein the first light passage portion and the second light passage portion correspond to the photosensitive element, light passing through the condensing structure produces a concentrated beam, and an aperture of the first light passage portion and an aperture of the second light passage portion are respectively adjusted according to a width of the concentrated beam at the first light-shielding layer and a width of the concentrated beam at the second light-shielding layer wherein a minimum width of the photosensitive element is WS, a focal length of the condensing structure is f, an outside diameter of the condensing structure is D, a maximum thickness of the condensing structure is LH, and a distance HS between a focal point of the concentrated beam and a top surface of the photosensitive element satisfies the following formula:

$$-\frac{WS \times (f - LH)}{D} \leq HS \leq \frac{WS \times (f - LH)}{D}.$$

10. The biometric device according to claim 9, wherein the light source is disposed on at least one side of the image module.

11. The biometric device according to claim 9, further comprising:

a cover plate disposed on the light source and the image module.

\* \* \* \* \*